（12）United States Patent
Nystad et al.

(10) Patent No.: US 8,719,553 B2
(45) Date of Patent: May 6, 2014

(54) METHOD FOR RE-CIRCULATING A FRAGMENT THROUGH A RENDERING PIPELINE

(75) Inventors: Jorn Nystad, Trondheim (NO); Frode Heggelund, Trondheim (NO)

(73) Assignee: ARM Norway AS, Trondheim (NO)

( * ) Notice: Subject to any disclaimer, the term of this patent is extended or adjusted under 35 U.S.C. 154(b) by 793 days.

(21) Appl. No.: 12/068,010

(22) Filed: Jan. 31, 2008

(65) Prior Publication Data

US 2009/0198972 A1   Aug. 6, 2009

(51) Int. Cl.
G06F 7/38 (2006.01)
G06F 9/00 (2006.01)
G06F 9/44 (2006.01)
G06F 15/00 (2006.01)

(52) U.S. Cl.
USPC .......................................................... 712/220

(58) Field of Classification Search
USPC .......................................................... 345/506
See application file for complete search history.

(56) References Cited

U.S. PATENT DOCUMENTS

| | | | |
|---|---|---|---|
| 5,016,169 A | 5/1991 | Koya et al. | |
| 5,644,752 A | 7/1997 | Cohen et al. | |
| 6,216,200 B1 | 4/2001 | Yeager | |
| 6,259,460 B1 * | 7/2001 | Gossett et al. | 345/552 |
| 6,260,131 B1 | 7/2001 | Kikuta et al. | |
| 6,650,333 B1 | 11/2003 | Baldwin | |
| 6,668,308 B2 | 12/2003 | Barroso et al. | |
| 6,801,986 B2 * | 10/2004 | Steely et al. | 711/152 |
| 6,950,909 B2 * | 9/2005 | Guthrie et al. | 711/146 |
| 6,965,970 B2 * | 11/2005 | Mosur et al. | 711/135 |
| 6,988,170 B2 * | 1/2006 | Barroso et al. | 711/141 |
| 6,993,628 B2 | 1/2006 | Starke | |
| 7,284,094 B2 | 10/2007 | Hrusecky et al. | |
| 7,454,590 B2 | 11/2008 | Jordan et al. | |
| 7,461,210 B1 | 12/2008 | Wentzlaff et al. | |
| 7,539,845 B1 | 5/2009 | Wentzlaff et al. | |
| 7,577,820 B1 * | 8/2009 | Wentzlaff et al. | 712/10 |
| 7,774,531 B1 * | 8/2010 | Karlsson | 710/220 |
| 7,814,292 B2 | 10/2010 | Tsien | |
| 7,818,544 B2 * | 10/2010 | Abernathy et al. | 712/219 |
| 2003/0126369 A1 * | 7/2003 | Creta et al. | 711/133 |

(Continued)

OTHER PUBLICATIONS

Kim et al.; An SoC With 1.3 Gtexels/s 3-D Graphics Full Pipeline for Consumer Applications; Jan. 2006; IEEE Journal of Solid-state Circuits, vol. 41, No. 1.*

(Continued)

Primary Examiner — Corey S Faherty
(74) Attorney, Agent, or Firm — Nixon & Vanderhye P.C.

(57) ABSTRACT

A microprocessor pipeline arrangement 1 includes a plurality of functional units 2, 3, 4, 5 and 6. Each functional unit 2, 3, 4, 5, 6 also has access to a respective cache memory 7, 8, 9, 10, 11.

Figure 1:
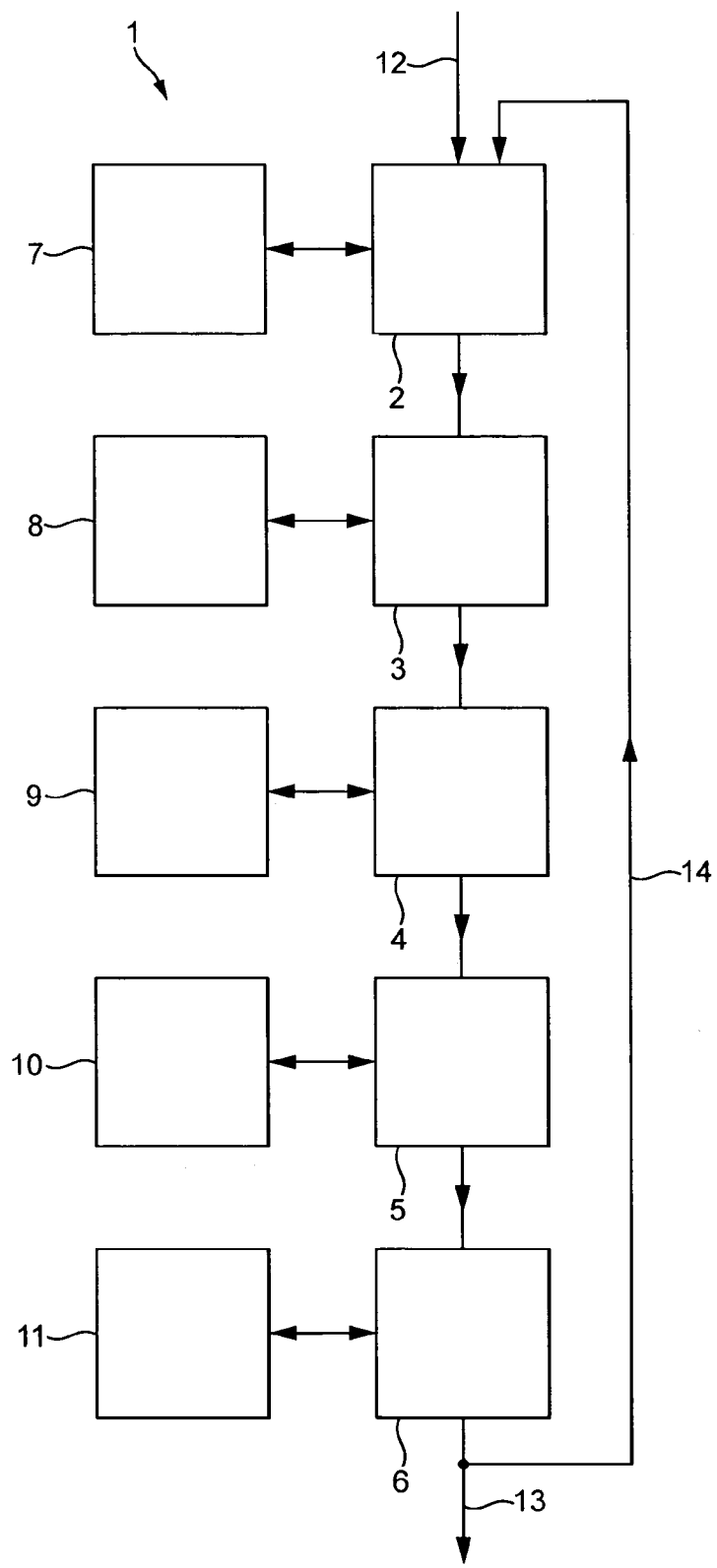

Threads for processing are received by the first functional unit 2 from an external source 12, and output by an end functional unit 6 of the pipeline to an output target 13.

If a thread encounters a cache-miss on its passage through the pipeline, the thread is allowed to continue to pass through the pipeline in the normal manner. However, when the thread reaches the end of the pipeline, it is sent via a loopback path 14 back to the beginning of the pipeline to be sent through the pipeline again. In this way, any thread that has not completed its processing on passing through the pipeline can be sent through the pipeline again to allow the processing of the thread to be completed.

28 Claims, 3 Drawing Sheets

(56) References Cited

U.S. PATENT DOCUMENTS

| | | | |
|---|---|---|---|
| 2003/0165147 | A1 | 9/2003 | Shimada |
| 2005/0002371 | A1 | 1/2005 | Andersen |
| 2005/0044319 | A1 | 2/2005 | Olukotun |
| 2006/0064549 | A1 | 3/2006 | Wintergerst |
| 2006/0184753 | A1 | 8/2006 | Jeter et al. |
| 2007/0050601 | A1 | 3/2007 | Chaudhry et al. |
| 2007/0067505 | A1 | 3/2007 | Kaniyur et al. |
| 2007/0106874 | A1 | 5/2007 | Pan et al. |
| 2008/0005504 | A1 | 1/2008 | Barnes et al. |
| 2008/0091880 | A1* | 4/2008 | Vishin ........................ 711/122 |
| 2008/0320230 | A1 | 12/2008 | Vishin et al. |

OTHER PUBLICATIONS

Igehy et al.; Prefetching in a Texture Cache Architecture; 1998; Eurographics/SIGGRAPH Workshop on Graphics Hardware.*
Blythe; The Direct3D 10 System; 2006; ACM.*
Related U.S. Appl. No. 12/068,009, filed Jan. 31, 2008; Inventor: Sørgård et al.
Related U.S. Appl. No. 12/068,012, filed Jan. 31, 2008; Inventor: Nystad et al.
"Cray MTA" http://www.cmf.nrl.navy.mil/CCS/help/mta/ 2002, 3 pages.
Office Action mailed Jul. 9, 2010 in co-pending U.S. Appl. No. 12/068,012.
Office Action mailed Nov. 23, 2010 in co-pending U.S. Appl. No. 12/068,009.
A. Ho et al, "On deadlock, livelock, and forward progress" Technical Report No. 633, University of Cambridge Computer Laboratory, May 2005, pp. 1-8.
T. Li et al, "Spin Detection Hardware for Improved Management of Multithreaded Systems" IEEE Transactions on Parallel and Distributed Systems, vol. 17, No. 6, Jun. 2006, pp. 508-521.
S. Abdelwahed et al, "Blocking Detection in Discrete Event Systems" 6 pages.
Office Action mailed Feb. 8, 2011 in co-pending U.S. Appl. No. 12/068,012.
Office Action mailed Jul. 19, 2011 in co-pending U.S. Appl. No. 12/068,009.
Rajwar et al, "Speculative Lock Elision: Enabling Highly Concurrent Multithreaded Execution" MICRO '01, Dec. 2001, 12 pages.
Notice of Allowance mailed Dec. 23, 2013 in co-pending U.S. Appl. No. 12/068,012.

* cited by examiner

METHOD FOR RE-CIRCULATING A FRAGMENT THROUGH A RENDERING PIPELINE

The present invention relates to microprocessor systems and in particular to microprocessor systems that process plural threads simultaneously (so-called "multithreaded" microprocessor systems).

Many microprocessors include plural functional or execution units that are arranged in a linear, pipelined fashion, in which a given thread for execution is passed down the pipeline and processed by the functional units of the pipeline one after another, in turn.

An example of such a microprocessor arrangement is a graphics processor which, as is known in the art, will typically include, inter alia, a so-called "rendering pipeline" in which the different function units of the rendering process, such as fragment shading units, texturing units, fogging units and blending units, etc., are arranged one after another in a linear or pipelined fashion and receive in turn a given fragment (graphics data element) for processing. The rendering process is carried out in this fashion because the individual rendering operations are typically independent of each other, and can frequently be carried out without reference to other operations or fragments, such that they can be carried out in a linear, pipelined fashion without detriment.

While it would be possible in such pipelined microprocessor arrangements to send given threads for execution through the pipeline one at a time (i.e. so that a thread does not enter the pipeline until the previous thread has exited the pipeline), it is also known to send multiple threads through the pipeline at any one time, one after another in series, such that a series of threads will progressively pass through the pipeline stages in turn. Such arrangements that can process multiple threads simultaneously are typically referred to as "multithreaded" processors or arrangements.

An example of a "multithreaded" processing arrangement is a graphics processing pipeline.

In the case of a graphics processing pipeline, the threads may, e.g., be the graphics "fragments" that the pipeline is to process (e.g. render). (As is known in the art, graphics rendering operations are usually carried out on discrete graphical entities or elements, usually referred to as "fragments", which represent and correspond to a given position in the scene to be displayed, and comprise, in effect, a set of data (such as colour and depth values) and, possibly, program instructions, for the position in question. Each such graphics fragment (data element) may correspond to a single pixel (picture element) in the final display (since as the pixels are the singularities in the final picture to be displayed, there may be a one-to-one mapping between the fragments the graphics processor operates on and the pixels in the display), but this is not essential and there may not be a one-to-one correspondence between "fragments" and display "pixels", for example where particular forms of post-processing such as down-sampling are carried out on the rendered image prior to its display.)

In such an arrangement, as is known in the art, graphics fragments (threads) for rendering will be sent through the rendering pipeline one after another in series, and at each execution cycle step down to the next step in the pipeline, such that at any given time, each step of the rendering pipeline will operate on a fragment, and then at the next cycle, receive the next fragment for processing, and so on.

As will be appreciated by those skilled in the art, in these arrangements, each "thread" in the graphics pipeline will typically represent and correspond to an instance of the program a graphics fragment is executing.

Similarly, the "threads" in pipelined microprocessor arrangements need not be or represent graphics fragments, but can be other forms of "threads", such as program threads, etc.

A problem that can arise with a multithreaded, pipelined microprocessor arrangement is that sometimes a given thread cannot be processed by the functional unit (pipeline) stage it has reached. This may be because, for example, the functional unit needs other data in order to be able to process the thread, but that data may not be present in a cache memory associated with the functional unit and so may need fetching from other memory in order for the thread to be processed (i.e. a cache "miss" occurs).

In such a situation, it would be possible to stall (block) the processing of the threads in the pipeline until the relevant data has been fetched and loaded in the cache so that the thread in question can be processed, but that has the disadvantage that the processing is blocked while the data is fetched. As it can take a relatively long time to fill a cache in this situation, valuable execution cycles in the functional units at the other stages in the pipeline may be lost if the whole pipeline is blocked until the cache is filled.

It is accordingly also known in some microprocessor architectures to remove such a "blocked" thread from the pipeline and place it in a buffer for retrying later, whilst allowing other threads then to continue running through the pipeline. In this case any "blocked" threads are stored in a retry buffer or "pool" and then selectively returned to the pipeline for processing from the retry pool, for example based on priority indications associated with the "pooled" threads. Such arrangements are used to try to reduce the "replay interval" for any blocked threads.

However, while such "retry pool" arrangements can provide satisfactory performance for relatively short pipelines and where the number of active threads is greater than the number of pipeline stages, the Applicants believe that such arrangements may not be so suitable for pipeline arrangements, such as those found in graphics processing, where they may be a relatively large number of pipeline stages, and a relatively large number of active threads but with only a small number of the threads potentially being "blocked" at any one time.

The Applicants believe therefore that there remains scope for improvements to multithreaded, pipelined, microprocessor arrangements.

According to a first aspect of the present invention, there is provided a method of operating a microprocessor system that includes a plurality of functional units arranged in a pipelined fashion and in which functional units of the pipeline can process threads for execution at the same time as other functional units of the pipeline are processing other threads for execution, the method comprising:

if a thread cannot be processed by the pipeline stage it has reached, passing the thread to the next pipeline stage without processing it, so as to allow the thread to continue through the pipeline; and recirculating a thread whose processing has not been completed on its way through the pipeline from the end of the pipeline to the beginning of the pipeline for sending through the pipeline again.

According to a second aspect of the present invention there is provided a microprocessor system for processing multiple threads for execution that are sent to it, the system comprising:

a plurality of functional units arranged in a linear, pipelined fashion, one after another, and each operable to receive and process a thread received from the preceding functional unit in the pipeline, and to pass a thread after processing to the next functional unit in the pipeline;

and wherein:

at least one of the functional units in the pipeline is operable to, if it cannot process a thread when it receives it, still pass the thread onto the next functional unit in the pipeline; and the system further comprises means at the end of the pipeline for returning a thread whose processing has not been completed on its passage through the pipeline to the beginning of the pipeline for sending through the pipeline again.

The present invention comprises a pipelined, multithreaded microprocessor arrangement, as discussed above in relation to the prior art. However, in the present invention, if a thread cannot be processed by a given stage (functional unit) of the pipeline, the thread is passed to the next stage of the pipeline. This effectively means that a "failed" thread is not blocked and does not cause the pipeline to block, but instead simply continues on its way through the pipeline. In this way the present invention provides a pipeline arrangement that allows the processing of threads to continue even if a thread cannot be processed for any reason.

Moreover, any thread that has not completed its processing when it reaches the end of the pipeline is returned to the beginning of the pipeline to be passed through the pipeline again. This allows "failed" threads that have not been blocked, but have instead been allowed to continue through the pipeline so as to avoid blocking the pipeline, as discussed above, to be returned to the pipeline so that they can have their processing completed. For example, a thread having a cache miss will not block the pipeline, but will loop back to the top of the pipeline to try again.

Returning threads from the end of the pipeline to the beginning of the pipeline for processing in this way provides a particularly convenient and low cost mechanism for "retrying" "failed" threads, and that, in particular, avoids the need to provide more complex thread prioritisation or selection mechanisms, and/or the ability to extract threads from different points in the pipeline, such as may be present in more complex thread retry "pool" arrangements.

The present invention accordingly provides, inter alia, a relatively straightforward and low cost mechanism for providing a "non-blocking" multithreaded, pipelined microprocessor arrangement that can accordingly provide an increased throughput of threads.

Indeed, it is a key aspect of the present invention that the Applicants have recognised that recirculating "failed" threads from the end of the pipeline to the beginning of the pipeline for retrying can advantageously be used to provide a "non-blocking" multithreaded pipeline arrangement, even when more complex "retry pool" arrangements may on the face of it appear more desirable. The Applicants have found that, surprisingly, there may in fact be no performance penalty with the considerably simpler arrangement of the present invention, as compared to existing prior art "retry pool" arrangements.

The pipeline arrangement of the present invention and that the present invention is applied to can take any suitable and desired form. It should comprise, as is known in the art, a plurality of functional units or stages, arranged in a linear, series fashion (i.e. such that a thread output from one functional unit is received as an input by the next functional unit in the pipeline and so on).

Each stage or functional unit of the pipeline will typically be and preferably is, an arrangement that performs a particular function and gives an output based on the input it receives. Each stage or functional unit may include and preferably does include plural steps (pipeline steps) that together perform the function in question. Where a stage (functional unit) includes multiple pipeline steps, then the stage can preferably contain plural threads simultaneously (e.g., and preferably, as will be discussed further below, one thread per pipeline step).

Thus there will be a series of functional units or pipeline stages, with each functional unit typically, and preferably, comprising a plurality of pipeline "steps", and receiving as its input thread the thread output by the preceding functional unit (stage) in the series (pipeline), and passing its output thread to the next functional unit in the series (pipeline) to act as the input thread for that functional unit (pipeline stage).

One or more, and preferably a plurality of, the functional units includes or has associated with it a cache for data to be used by the functional unit. Functional units may have their own caches, or share a cache with other functional units.

Similarly, as discussed above, the pipeline will comprise a linear series of pipeline steps, with each step (preferably) being able to operate on (process) a thread at the same time as other pipeline steps are processing other threads. In other words, at each execution cycle of the pipeline, each pipeline step preferably has a thread that it is to process for that cycle, and at the end of the cycle (upon each execution cycle), each thread will pass from one (its current) pipeline step onto the next step in the pipeline, and so on.

Thus, in effect, the pipeline will comprise a series of pipeline stages or functional units each including one or more pipeline steps, and at each execution cycle, the threads in the pipeline will each step down to their respective next step in the pipeline.

Thus, in a preferred embodiment, the pipeline will comprise a first, start functional unit (pipeline stage), one or more and preferably plural intermediate functional units (pipeline stages), and an end functional unit (pipeline stage), all arranged in series, one after another, to thereby form the pipeline.

The start functional unit (pipeline stage) should be operable to receive, and include means for receiving, a thread for processing, be operable to process, and include means for processing, a thread, and be operable to output, and include means for outputting, a (the) thread to the next functional unit (stage) in the pipeline. The start functional unit should be operable to receive a thread for processing that is either a new thread that has not passed through the pipeline before, or a thread that is being returned (recirculated) for retrying from the end of the pipeline in accordance with the present invention (as will be discussed further below).

The end functional unit of the pipeline should similarly be operable to receive and include means for receiving, a thread from the preceding functional unit (stage) in the pipeline, be operable to process, and include means for processing, a thread it receives, and be operable to output, and include means for outputting, a thread. The end functional unit should be able to output a thread to given output target, such as a memory (e.g. a buffer), or to output (return) a thread to the start of the pipeline (to the first functional unit of the pipeline) for retrying through the pipeline, in the manner of the present invention, depending on whether the thread has completed its processing in the pipeline or not. (Again, this will be discussed further below.)

A and preferably each intermediate functional unit of the pipeline is similarly preferably operable to receive, and includes means for receiving, a thread from the preceding functional unit in the pipeline, is operable to process and include means for processing a thread, and means for outputting a thread to the next functional unit in the pipeline.

For all the functional units of the pipeline, as discussed above, the threads preferably step down one pipeline step of the functional unit upon each execution cycle of the pipeline (e.g., and preferably, such that at each execution cycle of the pipeline, the first pipeline step of the functional unit will receive a thread, and the last pipeline step of the functional unit will pass a thread to the next functional unit (pipeline stage) for the start of the next pipeline execution cycle, and so on). Any intermediate pipeline steps in the functional unit similarly preferably process any threads they have at a given cycle and then pass the thread to the next pipeline step.

As discussed above, one or more, and preferably each functional unit (stage) in the pipeline is also operable to (and includes means for), if it cannot process a thread, pass the thread onto the next functional unit, without processing the thread, i.e. such that the pipeline processing is not blocked in such circumstances (and nor is the thread extracted from the pipeline at that point). This is preferably done by simply allowing the thread to continue to step down the pipeline steps through the functional unit(s). In this way, the pipeline continues to operate as "normal" for all the remaining threads, notwithstanding the fact that a thread could not be processed properly.

Such operation is preferably at least performed by and in respect of all functional units (pipeline steps) where a thread's processing could "fail" at the execution cycle the thread should be processed at (e.g., and preferably, those functional units that require "cached" data and/or that perform dependency checks in relation to other threads). However, any functional units where it is known that threads will always be successfully processed, need not be configured in this manner if desired.

It should also be noted here that in some arrangements a given thread may not need processing by each and every stage in the pipeline. In this case, the thread will still step down the pipeline stages as discussed above, and pass through each stage (functional unit) in turn, but will only be processed (operated on) by those stages (functional units) that apply to the particular thread in question.

The pipeline may include as many pipeline steps as is desired. However, the Applicants have found, as will be discussed further below, that the present invention is particularly applicable to relatively long pipeline arrangements, and thus in a preferred embodiment there are at least 128 steps in the pipeline. In one preferred embodiment, the pipeline comprises 128 pipeline steps.

Similarly, the pipeline will include plural functional units and may include as many functional units as is desired. As discussed above, each functional unit may and preferably does include plural pipeline steps. Thus, for example, the number of functional units is preferably commensurate with there being 128 pipeline steps.

The microprocessor pipeline can be for and take the form of any suitable pipeline microprocessor arrangement. Similarly, the functional units (pipeline stages) can accordingly be any appropriate and suitable functional units for the pipeline arrangement in question. For example, the present invention could be applied to and/or comprise a dsp (digital signal processor) arrangement, or an ordinary CPU arrangement that supports lots of threads.

In a particularly preferred embodiment, the microprocessor arrangement of the present invention or that the present invention is applied to is an arrangement in which there may be and preferably is a different thread for each pipeline step (rather than, e.g., a system in which a given thread may be spread across different pipeline steps). An example of such an arrangement is a graphics pipeline.

In a particularly preferred embodiment, the pipeline arrangement is a graphics processing, preferably a 3D graphics processing, pipeline (pipeline arrangement). In one preferred such embodiment, the pipeline arrangement is a graphics rendering pipeline arrangement. In a particularly preferred embodiment it is a pipelined microprocessor arrangement for carrying out graphics fragment (pixel) shading programs and processes). (As is known in the art, graphics processing can involve the application of various shading programs to graphics fragments to provide the relevant data for display of the fragment. This is commonly referred to as "fragment shading" or "pixel shading", and a pipelined series of microprocessor functional units can be used to execute the fragment shading program(s) on fragments for rendering.)

Thus, in a particularly preferred embodiment, the pipeline of the present invention is a graphics pipeline fragment (pixel)-shader (a pipeline for performing graphics fragment (pixel) shading programs). In this case the pipeline would start after the rasterisation stage (the rasteriser), and end before the blending with the frame buffer. The input to the pipeline would typically be, and is preferably, the instruction pointer to the first instruction to execute, and the output would typically be and is preferably the (fragment) parameter (e.g. the colour of the fragment) that is calculated by the program in question.

The invention could also be applied to, and in preferred embodiments is applied to, graphics primitive (triangle) set-up programs and/or blending programs.

Similarly, the functional units of the pipeline are preferably graphics, preferably 3D graphics, processing units, and in one preferred embodiment are rendering units of a graphics processing pipeline, such as, and preferably, a function generator or generators, a texture mapper or mappers, a blender or blenders, a fogging unit or units, logic operation units, and/or a fragment (pixel) shader unit or units, etc.

In the case of a graphics fragment-shader pipeline, the functional units of the pipeline preferably comprise (each covering several pipeline steps) one or more of, and preferably each of: an instruction fetch/decode unit, a varying unit, a texturing unit, a load unit, multipliers of an arithmetic unit, adders of the arithmetic unit, a lookup table unit, a store unit, and a branch unit (which evaluates the next instruction pointer and the end of program flag). It may also or instead include as discussed above a blending unit or units.

The threads that are processed by the microprocessor pipeline can similarly take any suitable and desired form. They will, as will be appreciated by those skilled in the art, be of a form that is appropriate for the pipeline arrangement in question. Thus they may, for example, comprise instruction threads for execution, data threads for processing, etc. The threads may, for example, have data, or program instructions, or both, associated with them.

In a particularly preferred embodiment, in the case of graphics processing, a and preferably each thread is an instance of the program a fragment is executing (an instance of a fragment program).

Thus, in a particularly preferred embodiment, the threads are or represent or correspond to graphics fragments for processing, as discussed above. In this case the fragments may have data associated with them (such as colour data (RGB values), transparency data (an alpha value), position data (x, y), texture coordinates (s, t), etc., as is known in the art), and/or may have program instructions and/or an instruction pointer or pointers associated with them, such as or for pixel (fragment) shader program instructions.

In a preferred embodiment, as will be discussed further below, a given fragment can be recirculated through the pipeline a number of times to be repeatedly processed by the pipeline. In this case the thread in the pipeline corresponding to the fragment will "carry" with it the instructions to be performed on the fragment on its current pass through the pipeline and then the fragment (thread) will be recirculated to pass through the pipeline again, but with a new set of instructions associated with the thread (fragment), representing another set of instructions to be carried out on the fragment and so on.

Each thread preferably represents a single fragment (x, y position) (such that, e.g., even if fragments tend to be grouped together (e.g. in 2×2 quads) for processing (e.g. because the fragments in the group have some common operations (such as derivatives) that are executed on a group-basis), each fragment in the group is still a separate "thread"). (However, it would, if desired be possible for each thread or to represent a group of plural fragments (x, y positions), such as a 2×2 block of fragments.)

The threads could also or instead, e.g., be instances of primitive (triangle) set-up programs or blending programs, as discussed above.

It will be appreciated from the above that there may be and preferably will be plural threads passing through (being processed by) the pipeline at any one time (since there are plural stages or functional units, each able to process a thread, present in the pipeline).

In a particularly preferred embodiment, the number of active threads in the pipeline can be, and preferably is, equal to the number of pipeline steps. In other words, there is preferably one active thread in the pipeline for each step of the pipeline, i.e. such that the pipeline is "full" of threads. Thus, in one preferred embodiment, the pipeline has, as discussed above, 128 steps, and there are 128 active threads in the pipeline at any given time (while the pipeline is in use).

The use of a relatively long pipeline with the number of active threads matching the number of pipeline steps helps to ensure that a relatively high throughput of threads from the pipeline can be maintained, notwithstanding that some threads may "fail". This also further reduces the need for any provision of more complex arrangements such as a retry pool, as high throughput can be achieved without such arrangements.

Thus, in a particularly preferred embodiment, there are, and the pipeline can support, at least 128, threads running and being executed (processed) at the same time (each at different pipeline steps). Similarly, the multithreaded pipeline arrangement of the present invention is preferably fine-grained, most preferably with as many active threads as there are pipeline steps.

As discussed above, any thread has not completed its processing on its passage through the pipeline is returned (e.g., and preferably, by the end functional unit of the pipeline) to the beginning of the pipeline for passing through the pipeline again.

It should be noted here that a thread that is returned to the beginning of the pipeline for sending through the pipeline again is sent to the first functional unit (stage) (the first pipeline step) of the pipeline immediately on the next execution cycle (i.e. it immediately loops back into the pipeline), without any delay or waiting. In effect, because the pipeline will be "full" of threads, when the thread "leaves" the end unit of the pipeline (and all the other threads similarly step down the pipeline) at the end of the execution cycle, that "creates" a "space" at the beginning of the pipeline for the thread to return to.

Thus, any thread that is returned from the end of the pipeline takes precedence (priority) for reinserting at the beginning of the pipeline over any completely new threads that may be due for processing. This has the advantage that there is no need for arbitration or selection mechanisms to control the returning of threads to the pipeline from the end of the pipeline.

Similarly, there is no, and no need for a, "retry pool" or a "waiting active thread pool" that can buffer plural threads for returning to the pipeline. Equally, there is only a single return (loopback) path for threads, the path from the end of the pipeline to the start of the pipeline, and there are no (and there is no need for) return (loopback) paths for threads from intermediate points along the pipeline.

As will be appreciated from the above, the system and method of the present invention should include some mechanism for identifying and determining whether a thread has completed its processing, and for, for example, then returning a thread to the beginning of the pipeline (or not) accordingly. This can be carried out in any desired and suitable manner.

In a particularly preferred embodiment, a, and preferably each, thread, can have, and preferably has, associated with it information, that indicates whether the thread's processing has been completed or not. Preferably, a thread also has associated with it information indicating the extent to which the thread's processing has been completed.

In a particularly preferred embodiment, a, and preferably each, thread has associated with it information indicating whether or not, and/or the extent to which, the current instruction in respect of thread (e.g., and preferably, the instruction to be executed on the thread's current passage through the pipeline) has been completed or not. If this information indicates that the current instruction on the thread has yet to be completed, the thread is recirculated through the pipeline as discussed above for the processing of that instruction to be tried again (or continued).

Most preferably, a or each thread also has associated with it information indicating whether (or not) all of the instructions for the thread have been fully executed. This would be useful, where, discussed above, threads may need to be recirculated through the pipeline a number of times for their processing, each time executing a different instruction. This thread completedness indication (i.e. the information indicating whether all instructions for the thread have been fully executed or not) can be used to indicate the recirculation of a thread to have a further instruction carried out on it (as distinct from the need to recirculate the thread to try the current instruction again (which is, as discussed above, preferably indicated by the instruction-completedness information associated with the thread)).

In a particularly preferred embodiment, a or each thread has associated with it information indicating both the completedness (or not) of the thread (in terms of all of the instructions to be executed for the thread), and the completedness (or not) of the instruction currently being executed for the thread. If the current instruction is not completed, then the thread is recirculated and the current instruction retried. If the current instruction is completed, but the thread as a whole is not "completed", then the thread will be recirculated but continue on to the next instruction. If both the instruction progress is complete and the thread progress is complete, then the thread can exit the pipeline (subject to any other requirements, as will be discussed further below).

In a particularly preferred embodiment, the instruction completedness information associated with the thread is used to set (or not) an indicator that indicates whether the intended processing of the thread on its passage through the pipeline has failed or not. This "failed" flag is preferably then used to trigger recirculation of the thread through the pipeline to retry the current instruction.

Thus in a particularly preferred embodiment, each thread has associated with it flag, preferably a single bit, which can be set to indicate whether a thread's (current) processing has failed or not. In this case, when a given functional unit cannot process a thread, it preferably sets the thread's "failed" flag to show that the thread's processing has failed. Thus, preferably, a single bit (instruction_failed) flag follows a thread through the pipeline, and is unset at the top (start) of the pipeline, and is set by any functional unit if that particular functional unit's processing of the thread failed.

A process in respect of a thread is preferably taken to have "failed" if the thread encounters a cache-miss (at the time it was due to be processed). In a preferred embodiment, a process in respect of a thread is also taken to have failed if all the (current) processing that the fragment (thread) is to undergo by the functional unit has not yet been completed (this may be desirable where a functional unit, as will be discussed further below, is to process a fragment (thread) a number of times in succession before its processing is completed).

The thread failed indication is preferably also set if a dependency (such as an ordering requirement) of the thread with respect to another thread or threads (this will be discussed further below) has not been met (preferably as at the time the thread reaches the end of the pipeline)) so as to trigger recirculating the thread through the pipeline by the thread "failed" check in those circumstances as well.

In a particularly preferred embodiment, the pipeline arrangement (e.g. and preferably the end functional unit of the pipeline), uses the instruction "completed" information (e.g., and preferably, the thread "failed" information) and the thread "completed" information associated with a thread to determine whether the thread should be returned to the beginning of the pipeline in the manner of the present invention. Thus, in a particularly preferred embodiment, the system and method of the present invention includes means for or steps of assessing information associated with a thread indicating the completion (e.g. failure) (or not) of processes to be performed for the thread, and returning the thread to the beginning of the pipeline on the basis of the assessment (e.g., and preferably, if the "failed" bit is set to indicate thread processing "failure").

It is believed that operating a functional unit of a pipelined microprocessor arrangement in this manner may be new and advantageous in its own right.

Thus, according to third aspect of the present invention, there is provided a functional unit for use in a pipelined microprocessor system that includes a plurality of functional units arranged in a pipelined fashion and in which threads for execution that are passed down the pipeline have associated with them information indicating whether a process or processes to be performed for the thread have failed and/or have been completed, the functional unit comprising:

means for assessing the information associated with a thread indicating whether a process or processes to be performed for the thread have failed and/or have been completed; and means for returning a thread to the beginning of the pipeline for sending through the pipeline again on the basis of the assessment of the information indicating whether a process or processes to be performed for the thread have failed and/or been completed.

According to a fourth aspect of the present invention, there is provided a method of operating a pipelined microprocessor system that includes a plurality of functional units arranged in a pipelined fashion and in which threads for execution that are passed down the pipeline have associated with them information indicating whether a process or processes to be performed for the thread have failed and/or been completed, the method comprising:

assessing the information associated with a thread indicating whether a process or processes to be performed for the thread have failed and/or been completed; and returning a thread to the beginning of the pipeline for sending through the pipeline again on the basis of the assessment of the information indicating whether a process or processes to be performed for the thread have failed and/or been completed.

As will be appreciated by those skilled in the art, these aspects and embodiments of the present invention can and preferably do include any one or more or all of the preferred and optional features of the invention described herein, as appropriate. Thus, for example, the functional unit is preferably arranged at the end of the pipeline, and preferably returns the thread (if it does so) to the beginning of the pipeline directly, for immediate retrying. Similarly, the functional unit preferably receives the thread from the preceding functional unit in the pipeline, assesses the information and then returns the thread to the beginning of the pipeline or not, accordingly.

In a particularly preferred embodiment, as discussed above, as well as, or instead of, and preferably as well as, a thread "failed" indication as discussed above, it is also monitored for a or each thread, whether a process or processes (instruction) the thread is to undergo have been completed or not. This may be particularly useful where a given thread instruction is to be processed by the same functional unit a number of times.

Thus, in a particularly preferred embodiment, the system and method of the present invention includes means for or a step of associating with a (and preferably with each) thread, information indicating whether a thread has completed (or not) a part or parts, or all, of its processing in respect of a given instruction. This "completeness identifier" preferably indicates, e.g., by means of setting bits in the identifier, which process or processes a thread has successfully undergone (completed). This information is preferably included in data associated with or for the thread.

In one particularly preferred embodiment, such an indication of whether a thread's processing has been completed or not is maintained in respect of plural separate processes (instruction parts) that the thread is to undergo (i.e. such that the completeness identifier will indicate separately for each of plural separate processes whether they have been completed or not).

It would be possible in such an arrangement to monitor and indicate the completeness of all the separate processes the thread is to undergo (for its current instruction). However, preferably such a record is only maintained for selected processes that the thread is to undergo (for selected parts of the instruction thread), such as, and preferably, those parts of the instruction (those processes for the thread) that will require cached data, and/or that are (e.g. the most) cache-miss sensitive (such as, in the case of graphics processing, the texture instruction, and/or the varying unit), and/or that are required to be undergone several times for the thread.

Preferably, in the case of graphics processing, the thread instruction "completeness" information is maintained in respect of, and preferably solely in respect of, the texturing instruction for a fragment (thread).

In one particularly preferred embodiment, the information indicating the extent to which a thread's processing has been completed or not (the "completeness identifier") comprises a bit-field indicating which data has been fetched already for the thread and a counter indicating, in the case of a graphics processing system texture instructions, which texture pass (anisotropic/mipmapping) the instruction is on. This bit-field is preferably updated each time data is transferred from a cache to the "fragment" (to the fragment data area).

It would be possible to check these thread completeness identifier or identifiers themselves for a thread to determine if a thread's (current) instruction processing has been completed or the thread should be returned through the pipeline for further processing. However, as discussed above, in a preferred embodiment, any functional unit for whose processes a completeness identifier is used sets the thread "failed" indication if its processes have still not been completed, so that the thread "failed" indicator is used to trigger the recirculating of the thread through the pipeline if it still has further processing to be undergone (its processing has yet to be completed) for a given instruction.

In a particularly preferred embodiment, as well as monitoring a thread's processing as it passes through the pipeline as discussed above, it is also monitored whether a thread has any dependency requirements in relation to other threads (such as, for example, a requirement that a given group of threads has to exit the pipeline simultaneously, and/or that the thread has to exit the pipeline in a particular order in relation to other threads). In this case, a thread is preferably also not allowed to exit the pipeline (the thread is looped back through the pipeline), if it is found when the thread reaches the end of the pipeline, that other threads on which it is dependent are not yet ready to exit simultaneously with the thread, and/or that the thread would be exiting the pipeline out of order with respect to other threads which have an order dependency with the thread in question, as appropriate.

Thus, as well as maintaining data relating to the completion or otherwise of processing of a thread, in a particularly preferred embodiment, there is also associated and maintained with respect to a thread information relating to any dependencies that the thread may have in relation to other threads that are being processed, such as, and preferably, a requirement that the thread must exit the pipeline in a particular order with respect to other threads, and/or at the same time as other threads.

This information is preferably also checked when the thread reaches the end of the pipeline, to see if these other requirements are met, and if they are not, then the thread is preferably returned to the beginning of the pipeline to pass through the pipeline again, as discussed above. In a preferred embodiment, this is done by setting (or not) a thread "dependency-check" indicator to trigger recirculation of the thread (as discussed above), if any such dependency requirement has not been met.

Thus, in a particularly preferred embodiment, a thread is only allowed to finally exit the pipeline if all its necessary processing has been completed, and if any dependencies associated with the thread (e.g., and preferably, in relation to other threads) are met. Otherwise, the thread is returned to the beginning of the pipeline to pass through the pipeline again.

As discussed above, a thread that "fails" its processing is still passed through the pipeline. In this case where a thread is not processed by a given functional unit in the pipeline (when it should have been, but could not be), the remaining functional units in the pipeline may still attempt to process the thread when they receive it (if they have no dependencies) or, alternatively, they could be arranged not to process the "failed" thread when they receive it (even if they could, in principle, do so). In the latter case, the thread will be passed (in due course) to the end of the pipeline without any further processing (but it will still pass through each functional unit in turn so as to get through the pipeline). The "completeness" identifier (state) associated with a thread could, for example, be used by subsequent functional units to identify "failed" threads for this purpose.

Although as discussed above the present invention allows for "failed" threads (e.g. and preferably threads that incur a cache miss) to not block the pipeline, it is still preferred for the pipeline to incorporate measures to try to stop thread "failures", such as cache misses, from occurring in the first place, as that will then further facilitate a high throughput of threads from the pipeline (and, e.g., reduce the number of threads that may need to be recirculated in the manner of the present invention).

Thus, in a preferred embodiment, the present invention includes means for or steps of pre-fetching the content of caches in the pipeline. In other words, as is known in the art, the process of fetching data needed to process a thread will be, if possible, begun in advance of the thread reaching the functional unit and cache where the data will be needed to process the thread. Such pre-fetching of data helps, as is known in the art, to ensure that the data is available in the cache when the thread reaches the relevant stage in the pipeline (and thus helps to avoid cache misses occurring).

Such pre-fetching of data for caches can be carried out in any desired and suitable manner, and may, e.g., be performed in respect of some or all of the caches of the pipeline. Different pre-fetch mechanisms may be used for different caches.

For example, cache address calls may be calculated and queried in advance of the cache being read. Thus, in the case of texture mapping in a graphics pipeline, for example, the texture cache address is preferably calculated and queried to the texture cache in advance of (preferably approximately 100 cycles before) the cache being read.

There may also or instead, for example, be pre-fetch hints for a subsequent, such as the next, instruction to be executed by a given thread (on its next cycle through the pipeline) included in the current instruction word of the thread (the instruction word for the current cycle of the thread through the pipeline). These instruction hints can accordingly be processed in advance of the instruction cycle to which they relate. Such "pre-fetch hints" may therefore allow the caches to be filled with the relevant data a long time before the relevant instructions are to be executed. (For example, in the case of a 128 step pipeline, the prefetching mechanism would have 128 execution cycles to fetch the hinted data (since that is how long it will take the thread to loop back through the pipeline again.)

It would also be possible, for example, to include in the pipeline one or more "delay" stages (buffers) so to give more time for data to be fetched to the caches.

As will be appreciated from the above, the operation of the present invention may result in threads being completed and exiting the pipeline in an order that is different to the order in which the threads were originally sent to the pipeline (since a recirculated thread will be delayed in its processing and thus may exit the pipeline out of its original position in the sequence of threads).

In many cases such out-of-order exiting of the pipeline (reordering of the threads) may not have any effect, but the Applicants have recognised that there may be some circumstances in which the order of the threads exiting the pipeline needs to be maintained. Thus, in a preferred embodiment, the present invention includes means for or steps of retaining or restoring the order of threads received by the microprocessor pipeline when the threads exit the pipeline.

For example, in the case of a graphics processing pipeline, it may be necessary to ensure that graphics fragments covering the same x, y position exit the pipeline in the correct order, for example to ensure that blending operations operate correctly. Thus, the threads from different primitives but for the same x, y position may and typically will, in effect, comprise a set of threads that need to exit the pipeline in order.

Thus, in a preferred embodiment where the present invention is applied to graphics processing, a dependency (order) check is made in respect of threads (fragments) relating to the same position (x, y position).

In a particularly preferred such embodiment, the pipeline, e.g., and preferably, an, e.g., functional unit, e.g., and preferably, at the end of the pipeline, can determine if a thread it is processing has an ordering requirement relative to other threads, and if it does, determine whether the thread if it were to be processed, would exit the pipeline in its right place in the order. If it is determined that the thread is in its right place in the order it can be allowed to exit the pipeline normally (subject to any other requirements being met), but if it is determined that the thread is out of order, the thread preferably does not exit the pipeline but instead is recirculated to the beginning of the pipeline (irrespective of whether the thread has actually completed its own processing at that time).

For example, in the case of graphics processing, if, when a thread (or group of threads) reaches the end of the pipeline, there are any other threads (groups of threads (quads)) in the pipeline that have the same x, y position and that are older than the thread (group of threads (quad)) at the bottom of the pipeline, the thread (or group of threads) at the end of the pipeline is preferably blocked from exiting the pipeline, and instead returned to the beginning of the pipeline in the manner of the present invention.

This has the effect that an out-of-order thread is not allowed to exit the pipeline (even if it has finished its processing) but is instead deferred (by returning it to the beginning of the pipeline). Such deferral can then allow other threads to exit in advance of the deferred thread, to thereby preserve the order of the threads. In effect, a thread that is out-of-order is "disallowed", and put back to the beginning of the pipeline, even if its processing is completed, so that the order can be preserved.

Thus, in a particularly preferred embodiment, the pipeline can determine if a thread would exit the pipeline in the correct order (e.g. and preferably with respect to one or more other threads) if it were to exit the pipeline, and if it determines that the exiting of the thread would not be in the correct order, the pipeline returns the thread to the beginning of the pipeline for it to be passed through the pipeline again.

Similarly, in a preferred embodiment, the pipeline arrangement of the present invention can track and monitor, and includes means for tracking and monitoring, order information associated with threads received by the pipeline for processing. Similarly, the pipeline preferably can use, and preferably includes means for using, such information to control the order in which threads are allowed to exit the pipeline.

The determination of whether a given thread is out-of-order or not can be carried out in any desired and suitable manner. In a particularly preferred embodiment, for a given set of threads that have to be processed in order, each thread in the set is time-stamped when it enters the pipeline (e.g., and preferably by indexing the thread with its (sequence) number in the order in the set when it is received at the pipeline).

Preferably, a comparison is then made between the time-stamp (index number) of a current thread (in the set) in the pipeline, and the time-stamp (index number) of all the other threads of the set of threads in question in the pipeline, to see if the current thread is the "oldest" thread in the set in the pipeline (in which case the ordering requirement is met) or not (in which case it should be returned to the beginning of the pipeline to defer its exiting).

In one particularly preferred such embodiment, a counter is used to tag (time-stamp) threads (in a given set of threads) with their order index number. Most preferably, a counter (an entry counter) is used to tag a thread with its index order number (which will be the current counter value) as it enters the pipeline (with the counter then being incremented).

It will be appreciated that such an arrangement can be used to maintain the order of threads for a given set of threads. However, the Applicants have recognised that there can be arrangements in which there may be plural sets of threads which each need to be in order within a given set, but which sets are effectively independent of each other (e.g. such that there is no need to preserve any ordering across the separate sets of threads). An example of such an arrangement is in graphics processing, where the exit order of threads (fragments) having the same x, y positions may need to be preserved, but the exit of fragments having different x, y positions can be in any order with respect to each other.

Such arrangements can be handled in the present invention by considering the timestamping separately, e.g., by considering separately the order indexing, for each individual set of threads that need their order to be maintained. Thus, in a particularly preferred embodiment, the system and method of the present invention can track and handle plural sets of (ordered) threads simultaneously. In this case, separate counts would, in effect, be maintained for each set of threads, and each thread would, e.g., be assigned an index corresponding to the "count" for the set of threads that it belongs to.

It may also be the case that threads that need to exit the pipeline in order already have some form of ordering information associated with them. For example, in the case of graphics processing, fragments (threads) may be associated with particular primitives (particular polygon (primitive) IDs), and the system will know the order in which the primitives should be processed. In this case it may not be necessary to index the thread (fragment) with an additional sequence number (e.g. "entry" number value as discussed above), as the ordering information (e.g. primitive ID) already associated with the fragment can be used instead.

As discussed above, in the case of graphics processing, the set of threads (fragments) that will need to be kept in order will be a set of threads from different primitives, but relating to the same fragment x, y position.

In this case, most preferably each primitive is allocated an index, and each thread for that primitive is then given that primitive index. Thus, for example, there is preferably a counter which increases by one for each new primitive and the value of that counter is assigned to each thread spawning from a respective primitive as its index value (time-stamp). In a preferred embodiment, the index is a circular index (i.e. is counted around its range repeatedly).

(In this arrangement there may be several threads (fragments)) within the pipeline from the same primitive and thus having the same primitive index, but this does not matter, as the threads will each be distinguished from each other by their fragment x, y positions (as in the case of graphics processing, it is threads (fragments) having the same x, y position that must be compared when exiting the pipeline to ensure the correct exit order).)

Then, when a thread reaches the end of the pipeline, the index for the thread in question is compared with the index of all the other threads within the pipeline and relating to the same x, y position, to see if there are any older threads for that x, y position still in the pipeline. If there are older threads for the same x, y position in the pipeline, then the current thread is not allowed to exit the pipeline but is recirculated.

Where a circular index is used, then in a preferred embodiment a record is also maintained of the "time-stamp" (index) of the last exited thread from the pipeline. This effectively indicates the oldest primitive in the pipeline and thus indicates the "wrap-point" ("tail-mark") of the circular index, which is, as will be appreciated by those skilled in the art, necessary to allow a correct comparison of the timestamps (indices) of all the threads in the set (for the x, y position) in the pipeline (because with a circular counter, a smaller index value may not necessarily always mean an older thread, because the index may have "wrapped" around its count at some point).

In a preferred such embodiment when the present invention is applied to graphics processing, for each thread (and/or 2×2 group of threads), the x, y location and an index (preferably a 5-bit and preferably a circular index) to the primitive the thread (or group of threads) belongs to is stored. The use of a 5-bit primitive index is preferred, as that then allows threads from as many as 32 different primitives to be in the pipeline simultaneously.

Most preferably, as discussed above, a record is also maintained of the oldest primitive (of the index of the oldest primitive) that has exited the pipeline (the count wrap-point or tail-mark). As discussed above, this primitive "tail-mark" allow the age of threads in the pipeline to be properly considered with a circular counter, in view of the fact that primitives may finish their processing out of order (because they may be on different x, y positions and so not in conflict with each other). This record (pointer), together with the primitive index per thread (or group (quad) of threads), can then be used, as discussed above, to compare the ages of threads (groups of threads (quads)) in the pipeline.

Thus, in a particularly preferred embodiment of the present invention when applied to a graphics processing system, when a thread reaches the end of the pipeline (and is otherwise able to exit the pipeline), it is checked whether there are any other threads in the pipeline that relate to the same x, y position as the current (due to exit) thread and that are older than the current thread. If so, then the current thread is not allowed to exit the pipeline, but is instead returned to the beginning of the pipeline to recirculate through the pipeline.

It can be the case in graphics processing that multiple copies of the same fragment (and thus, in effect, thread) may be sent through a graphics pipeline for processing, for example where a form of over- or super-sampling is being used in which multiple copies of the same fragment, but each representing a different "covered" sample point, are sent down the pipeline.

In this case you may have two threads each apparently representing the same fragment x, y position (and accordingly having the same primitive index). In order to allow for this, in one preferred embodiment of the present invention, each thread (or group (quad) of threads) can preferably also include a further index (a "super-sample" index), and then, if the threads have the same primitive index (equal primitive indexes), the "super-sample" indices of the threads are compared, with the thread having the highest super-sample index being considered to be the "younger" thread.

In another preferred embodiment, the "super-sample" index associated with a thread is used as a position indicator in combination with the "fragment position", as it effectively indicates the subsample-position of a fragment. In this case it can be taken that two threads with different super-sample-indices, even if they relate to the same fragment x and y position, do not overlap, and therefore can be allowed to exit out of order. Thus, in this case, the ordering requirement (timestamp) would only be checked in respect of fragments which have the same fragment x, y position and the same "super-sample" index. This has the advantage that each sub-sample of a super-sampled fragment does not have to exit in any particular order with respect to the other sub-samples of the super-sampled fragment.

The present invention is applicable however a thread may fail in its processing through the pipeline. However, as discussed above, in a particularly preferred embodiment, the present invention is used to recirculate threads who fail by virtue of a cache miss. Preferably, in the case of graphics processing, it is also used to recirculate threads when a tile buffer read fails (trying to read the colour of a fragment that has not yet been computed).

As discussed above, preferably threads can also or instead be caused to be recirculated by other threads that are grouped with the thread in question not being in the correct state. An example of this in the case of graphics processing would be a "rendezvous failure" (in which for a thread to complete its instruction (such as a derivative instruction) it is required that all other threads in a group of threads to which the thread belongs (preferably a 2×2 thread group (quad)) have the same instruction-pointer and none of the other threads in the group has failed for other reasons (such as a cache miss)).

Although the present invention has been described above with particular reference to the recirculation to the beginning of the pipeline of "failed" threads (e.g., and preferably, threads that have encountered a cache miss), the Applicants have recognised, as discussed above, that the present invention can also be used to pass threads through the functional units of the pipeline multiple times, irrespective, for example, of whether they encounter a cache miss or not. This could then be used, e.g., to send a thread on multiple passes through the pipeline, and thus, e.g., be processed by the same functional unit multiple times.

Such an arrangement could be used as an alternative to having plural identical stages in a pipeline, since instead of needing to duplicate pipeline stages so that the thread can receive all its processing in one pass through the pipeline, the thread can be sent through the pipeline multiple times to receive the same processing (for example if it is to undergo several program cycles). This may be particularly advantageous where only a relatively small number of threads need repeated processing, such that it may be more efficient to recirculate those threads, rather than provide an extra long pipeline in the first place.

Indeed, in the case of graphics processing, for example, it may be particularly advantageous to recirculate given threads many times through the pipeline for repeated processing, with each circulation of the thread through the pipeline carrying out, for example, a given instruction (instruction set) on the thread, and the thread then being returned to pass through the pipeline to have another instruction (instruction set) executed on it.

Thus, in a particularly preferred embodiment, the threads in the pipeline can be recirculated through the pipeline plural times so as to have further instructions (processing) carried out in respect of them. Preferably, a thread has defined for it a series of instructions to be executed on it, with each instruction indicating a set of processing to be carried out on the thread on one passage through the pipeline, and the thread is recirculated through the pipeline in the manner of the present invention to have each instruction (set of processing) carried out on it.

As will be appreciated, in these arrangements, if on any given passage through the pipeline the processing for the current instruction (set of processing) fails, then the thread will be recirculated for that instruction (set of processing) to be tried again, before moving on to the next instruction (set of processing) for the thread.

Thus, in a particularly preferred embodiment, a thread or threads, and preferably each thread, can have, and preferably does have, associated with it a series of instructions to be carried out on successive passes through the pipeline, and, in respect of such a thread, when the thread reaches the end of the pipeline (on a given passage through the pipeline), it is determined whether all the instructions (processes) for the thread have been completed and if they have not, the thread is recirculated to pass through the pipeline again. (It should be noted here that this check is different to a check to see if a thread's processing failed on its way through the pipeline, as a thread may still be returned for further processing, even if all the processing that should have been done on the thread's current pass through the pipeline was done.)

In this case, a thread or threads preferably have associated with them, as discussed above, a suitable completeness indicator which can, for example, indicate the progress of the instructions and/or processing that a thread is to undergo, such as, for example, indicating the current instruction or process that the thread is undergoing, and/or how many instruction and/or process cycles the thread has undergone and/or is to undergo, and/or indicating the progress of each of a series of processing cycles (instructions) that the thread is to undergo.

In a particularly preferred embodiment, the "thread" completeness identifier discussed above is used as the monitor of the progress of a thread's processing.

As discussed above, in a particularly preferred embodiment, such monitoring of the progress through multiple instructions (cycles) of a thread is only carried out in respect of certain, selected, processing stages that the thread is to undergo repeatedly, such as, in the case of graphics processing, the texture instructions.

Preferably in these arrangements the completeness identifier, if any, for a thread is checked when a thread reaches the end of the pipeline to see whether the thread is to undergo further instructions (in which case it should be recirculated through the pipeline), or has completed all its instructions (processes) so that it can then be allowed to exit the pipeline (subject to any of the other requirements discussed herein)).

In another preferred embodiment, if the completeness identifier indicates that a thread has not completed its processing, preferably the thread "failed" indicator is set so as to trigger recirculation of the thread in that manner.

It will be appreciated that in the present invention, threads that are allowed to exit the pipeline will need to be outputted to a destination output target, which typically will be a destination buffer in which the results of the processing of the thread are to be stored. Thus, any thread that enters the pipeline should have an associated output target (destination buffer) for its processing results.

It would be possible for there simply to be a single output target (destination buffer) for the pipeline, to which all threads are output, and in some circumstances that may suffice.

However, the Applicants have also recognised that in certain circumstances, such as for example in the case of graphics rendering, there may be situations where threads that are to enter the pipeline should have different output targets (destination buffers). This may be the case where, for example, threads to be processed in a graphics processing pipeline relate to different tiles and/or scenes of a graphics image to be rendered.

It would be possible in these situations still to have a single output target (destination buffer) that all threads exiting the pipeline are passed to. However, this may mean that threads having a different output target could not enter the pipeline until all threads for the existing output target have been processed.

It would be possible to provide plural physical output destination buffers (output targets) to help with this, but that may not always be possible or desirable, for example when there are size limitations on the microprocessor system.

Thus, in a particularly preferred embodiment, the microprocessor system is configured such that the threads to enter the pipeline can be effectively assigned output destination buffers so that for the purposes of the pipeline operation, it appears that the thread has an appropriate output target, even if an actual, physical, output target for the thread may not be available at that time. This is preferably achieved by allowing threads to be associated with "virtual" destination buffers (output targets) which do not actually physically exist, but, in effect, allow the system to consider the thread to have a legitimate output target.

Thus, in a particularly preferred embodiment, the threads in the microprocessor arrangement of the present invention can be associated with one of a plurality of virtual destination buffers (output targets). Threads are preferably associated with a given virtual destination buffer as they enter the pipeline. In a preferred embodiment, there are four virtual destination buffers.

This has the advantage that threads entering the pipeline can be allocated different output targets ("virtual" destination buffers) and thus can be allowed to enter the pipeline, without the need, for example, to flush the pipeline between such threads, and even if, for example, a physical output target may not actually be available for the thread at the time (such that the pipeline need not, e.g., be blocked due to a lack of output targets).

Indeed, it can avoid the need to have physical output buffers available for each and every thread that is to enter the pipeline, since instead threads can be effectively allocated to a virtual buffer.

This has the advantage therefore that the pipeline may be kept fuller (preferably full) with threads, even if the physical output resources for all the threads may not yet be available. This may be particularly advantageous in embodiments of the present invention where the pipeline is long, and each thread entering the pipeline may have many instructions (and therefore need to loop through the pipeline many times), as it then facilitates allowing such threads to enter the pipeline even though they may have different output targets (destination buffers), and, indeed, a physical output target may not yet be available (or, indeed, needed, for them).

Similarly, the use of virtual destination buffers allows threads to have a destination buffer associated with them as they enter the pipeline, but without requiring such a high number of actual, physical output buffers.

It will be appreciated that as well as a thread's notional "virtual" destination buffer, for a thread's results to actually be output from the pipeline, there will still, ultimately, need to be a physical output buffer which can be used for the actual, physical output of data from the pipeline.

Thus, in a preferred embodiment, the virtual destination buffers that threads can be associated with, can preferably be associated with a physical, actual output buffer, such that if a virtual buffer is associated with an actual physical buffer, the thread (the thread's output results) are output to the physical buffer when they are to be output.

Thus, at any given time, at least one of the virtual destination buffers is preferably associated (mapped to) with a physical output buffer, and threads having that virtual destination buffer as an output target are then output to the associated physical output buffer.

This means that, in effect, while all threads will appear as though they have virtual destination buffers as output targets, those threads having a virtual destination buffer that is currently associated with a physical output buffer as an output target will in fact be output (their data would be output) to the appropriate physical destination buffer.

There are preferably at least two physical output buffers, so that the pipeline can still output threads to a physical output buffer even if one of the physical output buffers is busy (e.g. because it is being written back to memory). This allows more efficient output from the pipeline and helps to avoid pipeline output being blocked. In a preferred embodiment there are only two physical output buffers.

Once a physical output buffer has been written back to memory, it is preferably then associated with another virtual output buffer, so that the threads having that virtual buffer as a destination buffer can then exit to the physical output buffer, and so on.

It will be appreciated that in this arrangement some threads may reach the end of the pipeline and be ready to exit the pipeline but their virtual destination buffer output target may not be associated with a physical output buffer. In this case, the thread cannot in fact be allowed to exit the pipeline (since there is no physical output target for it) and so instead the thread is preferably returned to pass through the pipeline again, in the manner of the present invention. Such recirculating of a thread is preferably continued until such time as a physical output target becomes available for the thread.

Thus, in a preferred embodiment, a check is made to see if a physical output target is available for a thread when the thread reaches the end of the pipeline, and if it is not available, the thread is recirculated to pass through the pipeline again.

The advantage of this arrangement is that threads can be allowed to enter the pipeline without the need for a physical output target for the thread in question. This facilitates keeping a long pipeline full of threads, thereby increasing the thread throughput of the system. Indeed, it is another advantage of the use of the return path of the present invention that facilitates allowing threads to enter the pipeline with "virtual" output targets, even when a physical output target is not yet available for the thread.

It is accordingly believed that such arrangements may be new and advantageous in their own right. Thus, according to a fifth aspect of the present invention, there is provided a method of operating a microprocessor system that includes a plurality of functional units arranged in a pipelined fashion in which each stage in the pipeline can process a thread for execution at the same time as other stages in the pipeline are processing other threads for execution, the method comprising:

associating each thread entering the pipeline with one of a plurality of virtual output buffers that can be allocated to threads;

associating at least one of the virtual output buffers with a physical output buffer; and when a thread reaches the end of the pipeline, determining whether the virtual output buffer associated with the thread has been associated with a physical output buffer, and if it has not, recirculating the thread from the end of the pipeline to the beginning of the pipeline for sending through the pipeline again.

According to a sixth aspect of the present invention, there is provided a microprocessor system that includes a plurality of functional units arranged in a pipelined fashion in which each stage in the pipeline can process a thread for execution at the same time as other stages in the pipeline are processing other threads for execution, the system comprising:

one or more physical output buffers;

means for associating each thread entering the pipeline with one of a plurality of virtual output buffers that can be allocated to threads;

means for associating at least one of the virtual output buffers with a physical output buffer; and means for when a thread reaches the end of the pipeline, determining whether the virtual output buffer associated with the thread has been associated with a physical output buffer, and if it has not, recirculating the thread from the end of the pipeline to the beginning of the pipeline for sending through the pipeline again.

As will be appreciated by those skilled in the art, these aspects of the invention can and preferably do include any one or more or all of the preferred and optional features of the invention described herein, as appropriate. Thus, for example, there are preferably at least two physical output buffers, and preferably more virtual output buffers than there are physical output buffers. Similarly, if the virtual output buffer associated with a thread has been associated with a physical output buffer, then the thread can be allowed to output to the physical output buffer and to exit the pipeline (subject to all other requirements for the thread being met).

It will be appreciated from the above that there may be several reasons why a thread may be recirculated in the manner of the present invention, and not just in the case of a "cache miss".

For example, threads may also be recirculated because they have to undergo further processing in the pipeline (undergo another cycle or cycles through the pipeline), because there is not yet a physical output buffer available for the output of the thread, and/or because there are dependency requirements in relation to other threads that have not been met.

Thus, in a particularly preferred embodiment, threads are recirculated from the end of the pipeline to the beginning of the pipeline for sending through the pipeline again in dependence upon at least one of, preferably one or more of, and most preferably all of, the following criteria: the processing of the thread on its passage through the pipeline failed; the thread has not yet completed all its process cycles through the pipeline; the thread is only associated with a virtual output buffer that has not been associated with a physical output buffer (where this arrangement is used); and/or there is a dependency requirement (such as an ordering requirement) in relation to another thread or threads in respect of the thread that is not met.

Thus, according to a seventh aspect of the present invention, there is provided a method of operating a microprocessor system that includes a plurality of functional units arranged in a pipelined fashion and in which each stage in the pipeline can process a thread for execution at the same time as other stages in the pipeline are processing other threads for execution, the method comprising:

recirculating a thread from the end of the pipeline to the beginning of the pipeline for sending through the pipeline again.

According to an eighth aspect of the present invention there is provided a microprocessor system for processing multiple threads for execution that are sent to it, the system comprising:

a plurality of functional units arranged in a linear, pipelined fashion, one after another, and each operable to receive and process a thread received from the preceding functional unit in the pipeline, and to pass a thread after processing to the next functional unit in the pipeline;

and wherein:

the system further comprises means at the end of the pipeline for returning a thread to the beginning of the pipeline for sending through the pipeline again.

As will be appreciated by those skilled in the art, these aspects and embodiments of the present invention can and preferably do include any one or more or all of the preferred and optional features of the present invention described herein, as appropriate. Thus, for example, the threads are preferably recirculated from the end of the pipeline to the beginning of the pipeline for sending through the pipeline again in dependence upon at least one of, preferably one or more of, and most preferably all of, the following criteria: the processing of the thread on its passage through the pipeline failed; the thread has not yet completed all its process cycles through the pipeline; the thread is only associated with a virtual output buffer that has not been associated with a physical output buffer (where this arrangement is used); and/or there is a dependency requirement (such as an ordering requirement) in relation to another thread or threads in respect of the thread that is not met.

Similarly, the processing order of threads sent to the pipeline can preferably be determined and maintained, for example, and preferably, in the manners discussed above.

It will be appreciated from the above that there may be circumstances where a thread has successfully completed its processing through the pipeline but is still recirculated through the pipeline, for example because it is being recirculated to preserve its exit order from the pipeline or, for example, because a physical output buffer is not yet allocated to the thread. It would be preferred in such circumstances for the thread when it is recirculated through the pipeline simply to pass through the pipeline without any further processing, and so, in a particularly preferred embodiment, threads can be recirculated through the pipeline without the pipeline carrying out any more processing of the thread as it passes through the pipeline again.

In a particularly preferred embodiment, this situation is indicated by associating with each thread a "completed" indicator, that indicates whether all the processing of the thread has been successfully completed. Then, when this completed indicator is set, the functional units of the pipeline can preferably identify that they do not need to further process the thread, but they can simply allow it to pass through the pipeline without further processing.

It will accordingly be appreciated from the above, that in a particularly preferred embodiment, each thread has associated with it a failed indicator, indicating, in effect, whether the thread has failed in any of its processing and needs recirculating through the pipeline, a completeness indicator which indicates in respect of, preferably only selected, processing stages of the pipeline whether the thread has completed the progress of the thread through multiple cycles of that processing that the thread is to undergo, and a "completed" indicator that indicates whether a thread has completed all of its processing successfully.

As will be appreciated from the above, a particularly preferred arrangement of the present invention will have as many active threads as there are pipeline steps, and there will be no waiting active thread pool. Thus, according to a further aspect of the present invention, there is provided a pipelined microprocessor arrangement that can and does process as many active threads as there are pipeline steps, and in which threads may be recirculated from the pipeline for replaying, and in which there is no waiting active thread pool.

The present invention can be used in and for any pipelined microprocessor arrangement, such as, for example, in general CPU arrangements.

However, as will be appreciated from the above, the present invention is particularly applicable in and to systems where greater latency of processing individual threads can be accepted, and, e.g., where overall throughput is important, since it will tend to increase thread throughput but at the expense of greater latency in respect of an individual thread. It is also particularly applicable to arrangements where all threads have equal priority for processing, as in that case the recirculating threads can be treated as equal priority for processing as "new" threads.

Indeed, an important advantage of the present invention is that it can support and provide high throughput of threads (high efficiency) and maintain a high number of threads in "flight" (number of "active" threads) at any one time.

An example of a system where "threads" have equal priority for processing, and throughput at the expense of latency is preferred, is a graphics (a 3D graphics) processing system. Thus, as discussed above, in a particularly preferred embodiment, the present invention is implemented in and for a (3D) graphics processing system. Similarly, the present invention extends to and includes a (3D) graphics processing system that includes or comprises the system of the present invention, and a method of operating a graphics processing system that includes the methods of the present invention.

The various functions and elements, etc., can be implemented as desired, for example, and preferably, by appropriate functional units, processing logic, processors, and microprocessors arrangements, etc.

As will be appreciated by those skilled in the art, all of the aspects and embodiments of the present invention can and preferably do include any one or more or all of the preferred and optional features of the present invention, as appropriate.

The methods in accordance with the present invention may be implemented at least partially using software e.g. computer programs. It will thus be seen that when viewed from further aspects the present invention provides computer software specifically adapted to carry out a method or the methods herein described when installed on data processing means, a computer program element comprising computer software code portions for performing a method or the methods herein described when the program element is run on data processing means, and a computer program comprising code means adapted to perform all the steps of a method or of the methods herein described when the program is run on a data-processing system. The data processing system may be a microprocessor arrangement, or a programmable FPGA (Field Programmable Gate Array), etc.

The invention also extends to a computer software carrier comprising such software which when used to operate a pipelined microprocessor arrangement comprising data processing means causes in conjunction with said data processing means said arrangement to carry out the steps of a method or of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of a method or of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Figure 2:
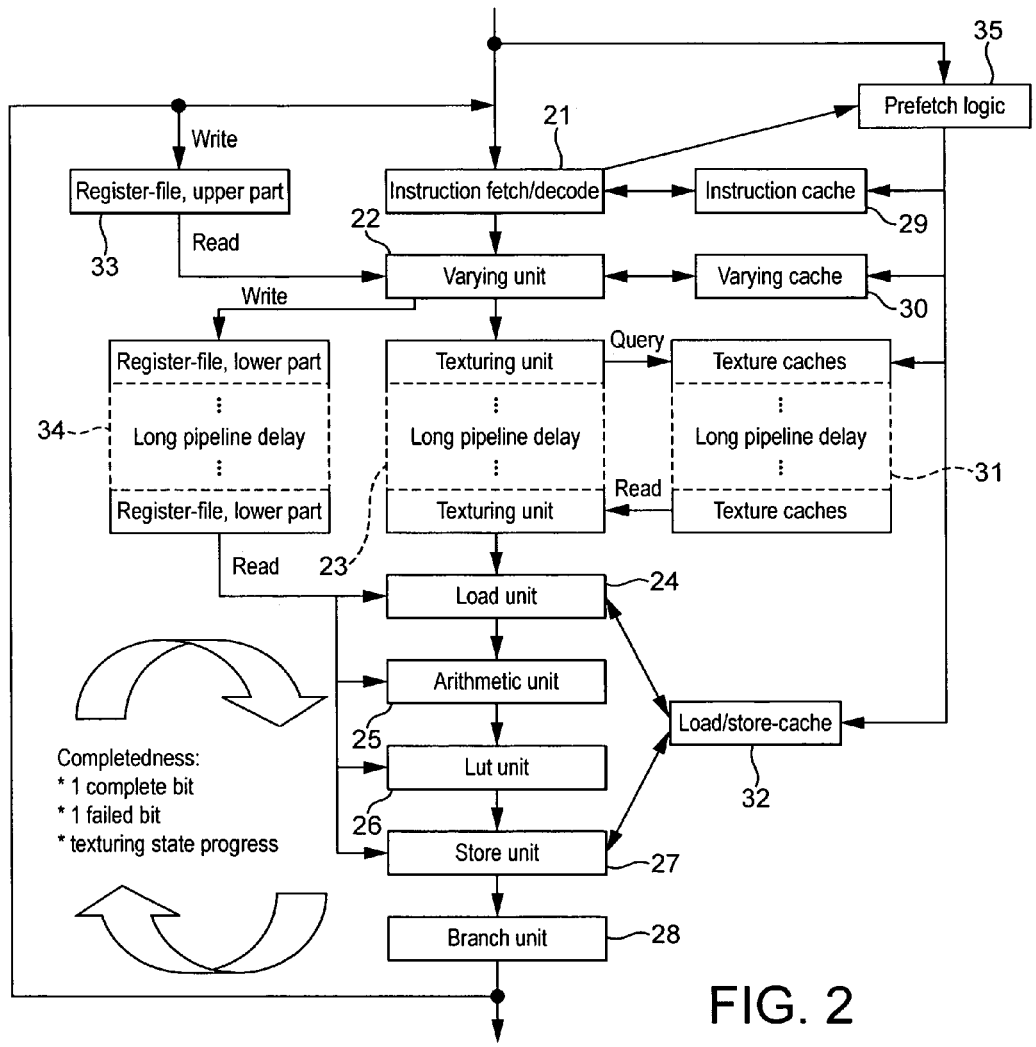
Figure 3:
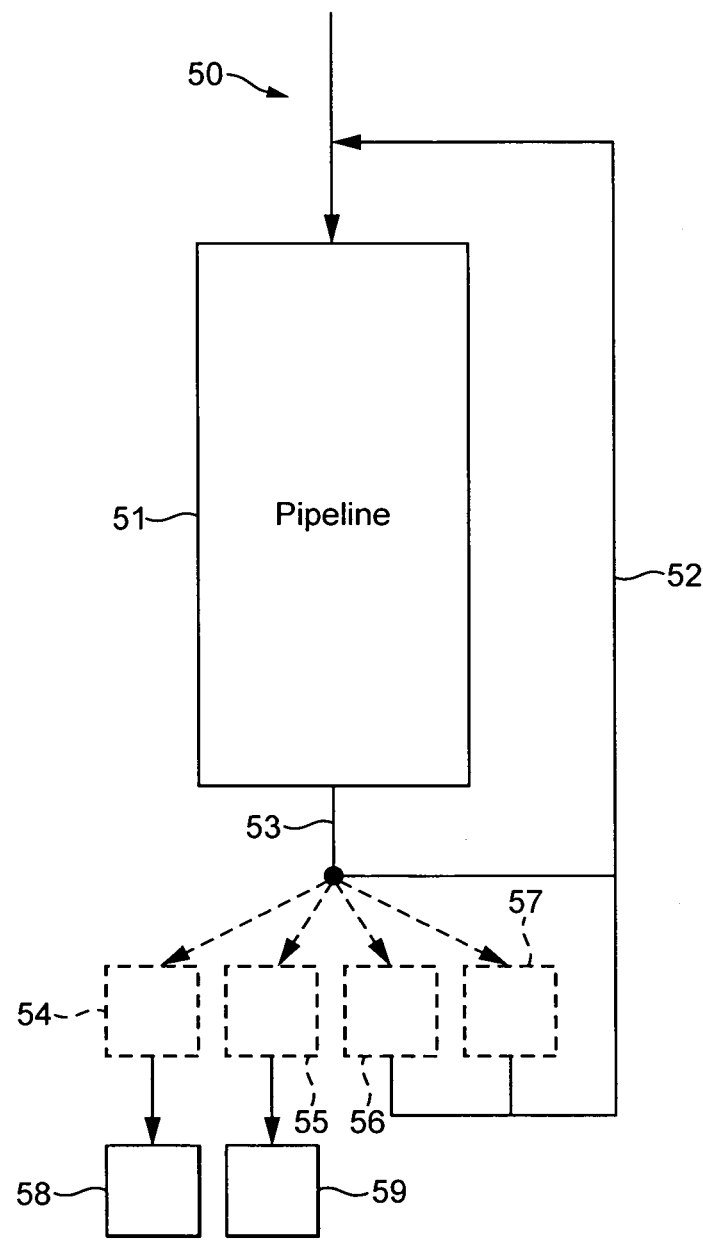

A number of preferred embodiments of the present invention will now be described by way of example only and with reference to the accompanying drawings, in which:

FIG. 1 shows schematically a pipelined microprocessor arrangement that is operable in the manner of the present invention; and FIGS. 2 and 3 show schematically another pipelined microprocessor arrangement that is operable in the manner of the present invention.

The microprocessor pipeline arrangement 1 shown in FIG. 1 includes a plurality of pipeline stages or functional units 2, 3, 4, 5 and 6, arranged in a linear, series fashion, one after another. Each functional unit will, as is known in the art, include a plurality of pipeline steps, and in the present embodiment, each step can "have" a thread in it at any given time.

Each functional unit 2, 3, 4, 5, 6 also has access to a respective cache memory 7, 8, 9, 10, 11, from which it can retrieve data needed to execute the processing to be performed by the functional unit.

As shown in FIG. 1, the first functional unit 2 in the pipeline can receive threads for processing from an external source 12, and the end functional unit 6 of the pipeline can output processed (completed) threads to an output target 13.

The pipeline arrangement 1 shown in FIG. 1 also includes, in accordance with the present invention, a loopback or return path 14, via which threads can be returned from the end 6 of the pipeline to the beginning 2 of the pipeline for sending through the pipeline again. This operation will be discussed in more detail below.

As will be appreciated by those skilled in the art, although FIG. 1 only shows a small number of functional units in the pipeline 1 for clarity, in practice there will be many more functional units in the pipeline. A preferred embodiment of the present invention is for there to be 128 pipeline steps.

It should similarly be noted that not every functional unit (pipeline stage) need have access to a cache memory. There may be some functional units (pipeline stages) that do not require cached data.

In its basic operation, the pipeline arrangement shown in FIG. 1, will, as is known in the art, receive a series of threads for processing from the source 12, and each thread will progressively step down the pipeline stages (functional units), so that, in effect, all the threads pass through the pipeline stages (functional units) one after another and are appropriately processed thereby. Once a thread reaches the end functional unit 6, then, if its processing has been completed, and it can otherwise be allowed to exit the pipeline, upon the next execution cycle it is sent to the output target 13.

Thus, upon each execution cycle of the pipeline, the functional unit 3, for example, will receive a thread for processing from the preceding functional unit 2, and output a thread to the next functional unit 4 in the pipeline, and so on, as is known in the art. In practice threads will pass to the next step of the pipeline upon each pipeline execution cycle.

The microprocessor pipeline 1 in the present embodiment is a graphics processing pipeline, and in particular a processing pipeline for carrying out fragment shading programs (i.e. for shading (rendering) graphics fragments).

This being the case, the functional units in the pipeline comprise processing units that are each able to perform particular program steps on threads (fragments) that they receive. The necessary program steps are stored in the respective caches of the functional units, and each thread (fragment) carries with it a set of program instructions that indicates which program steps each functional unit is to perform on the thread (fragment). (This arrangement is possible for graphics processing, because in a graphics processing arrangement typically each thread (fragment) will have the same program steps executed on it, and the programs in themselves will be relatively short. This allows the necessary programs to be held in the caches associated with the functional units, and for the relevant program steps to be triggered by associating a short set of program instructions with each thread (fragment).)

Thus, in the present embodiment, the "threads" that are sent through the pipeline 1 comprise an instance of the program that a graphics fragment for rendering is executing. The threads accordingly, preferably have associated with them, for example, graphics data, such as colour, and position data, and also, as discussed above, a program instruction pointer or pointers indicating the program steps to be executed by the functional units on the graphics fragment.

In a particular preferred embodiment, each fragment has a set of (e.g. 6) four-component registers that can be read/written by the functional units, an instruction pointer and a stack pointer, temporary data stores for texture lookups (for partial texture progress), a renderer state index, a primitive (polygon) data word index, fragment position (x, y) data, a destination buffer ID, and a primitive index (age value).

In the present embodiment, the threads are sent through the graphics pipeline as groups of 2×2 blocks (quads) of threads (representing 2×2 quads of graphics fragments (fragment x, y positions), with each thread in the quad being dependent in some way on the other threads of the quad.

As is known in the art, when a thread is to be processed by a given functional unit and that processing requires data stored in a cache associated with a functional unit, it can be the case that the relevant data is not available in the cache at the time that it is needed to process the thread. This situation is referred to as a "cache miss".

In the present embodiment, and in accordance with the present invention, if such a cache miss occurs, the processing of threads in the pipeline is not blocked, nor is the thread immediately removed from the pipeline at the point that it has failed. Instead, the thread is simply allowed to continue through the pipeline to the next pipeline step (and thus, in time, to the next functional unit (pipeline stage), and so on). In this way, any threads that cannot be processed do not "block" the pipeline, but instead simply continue to pass through the pipeline in the normal manner.

Furthermore, again in accordance with the present invention, the pipeline 1 includes, as shown in FIG. 1, a loopback path 14 that can return to the beginning of the pipeline for sending through the pipeline again, threads (fragments) that have not completed their processing when they reach the end of the pipeline (e.g. because they encountered a cache miss and so could not be processed by a functional unit on their way through the pipeline). In this way, any threads that have not completed their processing on passing through the pipeline can be sent through the pipeline again to allow the processing of the thread to be completed.

In order to facilitate this operation, in the present embodiment each thread has associated with it "failed" indicator (in the form of a single-bit, "failed" flag) that indicates whether the processing of the thread failed or not.

If a functional unit in the pipeline cannot process the thread when it receives it (e.g. because there is a cache miss), then the functional unit sets the "failed" indicator for the thread accordingly. When a thread reaches the end of the pipeline, the failed indicator associated with the thread is checked, and if it indicates that the thread's processing failed, the thread is not allowed to exit the pipeline, but the thread is instead sent around the loopback path 14 to the beginning of the pipeline for passing through the pipeline again. The failed bit is also reset, so that it can be reused for the thread's next passage through the pipeline.

It should be noted in this regard that the thread returns to and is inserted into the beginning of the pipeline at the next execution cycle, i.e. it "leaves" the pipeline and is immediately returned to the beginning of the pipeline to occupy the space that is created by the thread leaving the pipeline (and the intermediate threads all stepping one step down the pipeline).

In this way, any thread whose processing fails on its way through the pipeline, is, when it reaches the end of the pipeline, returned to the beginning of the pipeline to pass through the pipeline again. This ensures that the thread's processing will be completed over time.

The present embodiment also includes a mechanism (not shown) for maintaining the order of processing of the threads. This is to allow for thread ordering restrictions, for example where different threads (fragments) relate to the same x, y position. In graphics processing, fragments from different primitives may cover the same x, y position in the scene and typically then need to be processed (rendered) in order.

In order to handle such thread (fragment) ordering restrictions, the system of the present embodiment further includes an arrangement that uses primitive identifiers associated with each fragment (thread) that is sent through the pipeline 1 for processing to maintain the order of processing of the fragments.

The system firstly checks whether a given thread (fragment) entering the pipeline relates to the same x, y position or positions as another thread (fragment) that is present in the pipeline, and if it finds that is the case, then it marks the thread accordingly. The thread is also allocated a primitive index to indicate the primitive the thread (fragment) "belongs" to. This "timestamps" the thread.

Then, when such a thread (fragment) reaches the end of the pipeline, it is determined whether, if the thread was allowed to exit the pipeline at that point, it would exit the pipeline in the wrong order. If so, then instead of allowing the thread to exit the pipeline, it is sent back on the return path 14 to the beginning of the pipeline 2 so as to pass through the pipeline again.

In other words, a check is made as to whether a given thread (fragment) can be allowed to exit the pipeline, and if it is found that the thread would exit the pipeline out-of-order, it is not allowed to exit the pipeline but is instead returned to the beginning of the pipeline to pass through the pipeline again. In this way, the order of the threads exiting the pipeline can be maintained.

In the present case, for each quad (group) of 2×2 threads, the x, y location, a circular 5-bit index to the primitive that the quad belongs to, and a "super-sample" index is stored. (The super-sample index is used when the system sends multiple copies of the same fragment down the pipeline but having a different sample position for each copy. This in effect sends fragments having the same primitive index at the same x, y position to the pipeline, so the super-sample index is then used so as to distinguish between such threads.)

A record (a global pointer) that indicates the primitive index of the last thread quad to exit the pipeline (effectively the oldest primitive in the pipeline) is also stored. This indicates the "wrap-point" (tail-mark) of the circular index.

This is necessary because as a circular index is used in the present embodiment, the relative ages of the indices cannot solely be indicated by the value of the index, but it is also necessary to know the "wrap-point" (tail-mark) of the circular index. For example, if the indexing used four values, 0, 1, 2, 3, and the "wrap-point" of the index was 0, then the order of index values from oldest to newest would be 0, 1, 2, 3. However, if the wrap-point of the index was 2, then the order of index values in the pipeline from oldest to newest would be 2, 3, 0, 1, and if the wrap-point was 3, the order of the indices in the pipeline from oldest to newest would be 3, 0, 1, 2, and so on.

When the thread quad reaches the end of the pipeline, its primitive index (time-stamp) is compared with the primitive indices of all other thread quads in the pipeline having the same x, y position. This comparison is done by performing the comparison with all thread quads in the pipeline.

These parameters allow the age of each thread quad in the pipeline to be determined. Then, when a thread "quad" reaches the end of the pipeline, it is determined whether there are any other thread "quads" in the pipeline that are older than the one at the bottom of the pipeline and having the same x, y position. If so, the current thread "quad" is blocked from exiting the pipeline, and it is instead returned to the beginning of the pipeline for recirculation through the pipeline.

In the present embodiment, a thread is considered to be older than the current thread either if its primitive index is lower and both primitive indices are on the same side of the primitive index "wrap-point", or its primitive index is higher than the primitive index "wrap-point" and the current thread's primitive index is not, or both threads' primitive indices are equal and the super-sample index of the other thread is lower.

Other arrangements for handling thread ordering restrictions would be possible. For example, pairs of entry and exit counters, one pair for each different set of ordered threads that might be expected to have to be handled at any one time, could be used for this purpose. These counters could then operated as follows in order to preserve the thread ordering.

Firstly, upon receipt of a given thread, the set of threads to which the thread relates is determined, and the thread is then tagged with the current entry counter value for that thread set as it enters the pipeline 1. The entry counter is then incremented. This effectively tags each thread in the set with its number in the thread sequence (order).

The corresponding exit counter for the set of threads in question is similarly used to count threads as they complete and exit the pipeline 1. Thus, if a thread for the set completes (exits the pipeline 1), the exit counter for that set of threads is incremented.

The system compares the count value tagged to a current thread that it is to process with the current exit counter value for the set of threads in question, to determine whether the current thread is out of order or not.

If the processing of the current thread can be completed by the pipeline and its tagged counter value when compared with the appropriate exit counter value shows that it is in its correct place in the order, then the thread is allowed to exit the pipeline and the exit counter is incremented.

On the other hand, if the processing of the thread can successfully complete, but the comparison of the exit counter value and the thread's tagged counter value shows that the thread is out of order, the system does not allow the thread to exit the pipeline 1, but instead sends the thread to the loopback path 14 so as to defer its completion, from where it will be re-sent through the pipeline as discussed above. (If the current thread fails anyway because of a cache miss, it will be sent to the loopback path 14 in any event.)

This mechanism can accordingly be used to ensure that the threads are only allowed to exit the pipeline in the correct order. The maximum counter values are preferably larger than the total number of threads that can exist within the pipeline at any one time, so as to help ensure this.

The present embodiment also includes mechanisms to pre-fetch the content of the caches, as that again helps to avoid cache misses occurring in the first place. In the present embodiment, several cache pre-fetch mechanisms are used. Firstly, the texture cache address is calculated and queried to the cache approximately 100 cycles before the cache is read. For other caches, there are pre-fetch hints in the instruction words of the threads that are processed many cycles before the actual instruction.

It would also be possible, for example, to include delay buffers in the pipeline to provide time for cache fetches to be completed.

Other arrangements and variations to the present embodiment would be possible. For example, as well as using the loopback path 14 to return threads whose processing has not been completed to the beginning of the pipeline, it would also be possible to use that mechanism to allow a thread to be processed by the functional units of the pipeline again, even if, for example, all the functional units were able to process the thread on its (first) passage through the pipeline.

This would allow, for example, an arrangement in which, where a thread needs to be processed by a given functional unit multiple times, that is achieved by repeatedly looping the thread back through the pipeline so that it passes through the same functional unit multiple times, instead of, for example, including the same functional unit multiple times in the pipeline. In other words, the present invention can allow functional units in the pipeline to be reused when processing threads, rather than, for example, having to provide a pipeline that includes all the functional units that may be required.

This may be particularly useful where, for example, a given thread needs to go through the same program cycle several times.

Indeed, it may be relatively common, for example in graphics processing, for a given fragment (thread) to need to have plural instructions executed on it in series. The present embodiment can be used to achieve this, by sending the threads through the pipeline multiple times, once for each instruction set to be executed on it. In this case, it is preferred to associate with each thread a thread "completeness" indicator to indicate whether the thread has completed the execution of all its instructions or not, which indicator can accordingly be checked to determine whether the thread needs recirculating through the pipeline for further instructions to be executed on it, or not.

In the present embodiment, the completion or not of a thread's processing is not tracked for all parts of the instruction associated with the thread (although that would be possible), but is only tracked for the most cache-miss sensitive parts of the instruction, such as in the case of the presence graphics processing embodiment, the texture instruction part.

FIGS. 2 and 3 show schematically a more detailed arrangement of a graphics processing pipeline that can be operated in the manner of the present invention. FIG. 2 shows the pipeline architecture in more detail, and FIG. 3 shows the output arrangement of the pipeline in more detail.

The graphics processing pipeline shown in FIG. 2 again includes a plurality of functional units, in this case comprising an instruction fetch/decode unit 21, a varying unit 22, a texturing unit 23, a load unit 24, an arithmetic unit 25, a lookup table unit 26, a store unit 27, and a branch unit 28. Each of these functional units comprises several pipeline steps, as discussed above.

The branch unit 28, inter alia, evaluates the next instruction pointer and the end of program flag.

There are also appropriate register file arrangements (a register-file upper part 33 and a register-file lower part 34) 33, 34, and a pre-fetch logic processing unit 35. The pre-fetch logic unit 35 is controlled by the instructions associated with a thread and the renderer state associated with the thread (fragment) and uses this data to pre-fetch data to the caches. In this embodiment, this pre-fetching can allow almost all the caches to pre-fetch data before the data is needed to be used.

As shown in FIG. 2, the functional units have associated with them appropriate cache memories, such as an instruction cache 29, a varying cache 30, texture caches 31 and a load/store cache 32.

As shown in FIG. 2, there is also a deliberate long pipeline delay in the middle of the pipeline. This delay reduces the possibility of texture cache misses occurring (as it provides more time for texture cache fetches triggered before the delay "stage" to complete).

Finally, the arrangement includes a return path 14 for returning threads to the beginning of the pipeline in the manner of the present invention.

FIG. 3 shows schematically the preferred output arrangement for the pipeline arrangement of the present embodiment. FIG. 3 shows schematically the pipeline 51 together with a return path 52, and also shows an array of output targets for the pipeline, comprising plural virtual output buffers 54, 55, 56 and 57, together with two physical output buffers 58 and 59.

Any thread entering the pipeline will need to have an output target to which its output is written once its processing has been finished. However, because in the present embodiment the pipeline 51 is quite long, and each thread exiting the pipeline may have (will probably have) many instructions (thereby looping through the pipeline many times), it is preferred for the pipeline to be able to, at any given time contain threads which, in effect, relate to different output targets.

In order to allow for this, and to avoid, for example, having to prevent threads from entering the pipeline until an appropriate output target is available, the present embodiment includes, as shown in FIG. 3, four virtual output buffers 54, 55, 56 and 57. Each thread entering the pipeline is then given one of these virtual output buffers as its output target (destination buffer). This then allows threads relating to different "output targets" to be sent through the pipeline at the same time.

However, because the virtual output buffers 54, 55, 56 and 57 cannot in themselves be used to provide the required output from the pipeline, there are also, as shown in FIG. 3, two physical output buffers, 58 and 59. At any given time, one of the virtual buffers 54, 55, 56 and 57 is associated with (attached to) a respective one of the physical buffers 58 or 59, so that threads having that virtual output buffer as a destination buffer in fact are output (their data is output) to the respective physical buffer.

Two physical output buffers 58 and 59 are provided, so that there will always be one physical output buffer available for the output of threads, even if one of the physical output buffers is busy (for example being written back to memory).

As soon as a given physical output buffer has been processed (written back to memory), it is then attached to a new virtual buffer, so that the threads having that virtual buffer as the destination buffer will instead be output to the physical output buffer.

For example, the virtual buffer 54 may be attached to the physical buffer 58 that is being written back to memory, and the pipeline 51 may also contain some threads for virtual buffer 55 that is attached to physical buffer 59 (these threads, when finished, will thus be written to the physical buffer 59).

The pipeline may also contain some threads for virtual buffer 56 that are in the middle of their processing (and thus their virtual buffer 56 is not yet assigned to a physical buffer yet, as no physical output buffer is needed yet). Similarly, the pipeline may contain a few threads for virtual buffer 57 that have started their processing recently and have lots more processing to do (and thus no physical output buffer is needed for them).

In this arrangement, although the use of the virtual output buffers allows threads having different destination buffers to be in the pipeline at the same time, only those threads that can actually be output to a physical output buffer can actually exit the pipeline (since threads having a virtual output destination buffer are not actually thereby being output to a true physical output target).

Thus, when a thread reaches the end of the pipeline, it is checked whether or not the thread has a physical output buffer attached to its virtual destination buffer. If so, the thread can be allowed to exit the pipeline (assuming all other "exit" checks are met, as will be discussed further below).

However, if the thread does not actually have a physical output buffer attached to its virtual destination buffer, then the thread cannot be output to a physical output buffer, and so cannot exit the pipeline. Instead, the thread is returned via the return path 14 to pass to the top of the pipeline so that it can pass through the pipeline again and try again later to see if there is a physical output buffer available to it.

The operation of the pipeline shown in FIG. 2 is basically the same as for the pipeline shown in FIG. 1.

Thus, again, groups (quads) of 2×2 threads, with each thread comprising an instance of a fragment program, are sent through the pipeline in series, and when they reach the branch unit 28 at the end of the pipeline, it is determined whether the threads can be allowed to exit the pipeline, or whether they need to be recirculated via the return path 14 to pass through the pipeline again.

In the present embodiment, each thread has associated with it a "failed"-bit, which "follows" the thread through the pipeline. This bit is not set at the start of the pipeline, but can be set by the different functional units if the processing by that functional unit fails (e.g., because of a cache miss). This "failed" bit thereby indicates whether the thread has completed its processing for its current passage through the pipeline or not, i.e. indicates the success (or not) of the execution of all the functional units in the pipeline for one cycle through the pipeline. (Thus, it is reset to zero every time a thread loops through the pipeline again.)

If the "failed"-bit has been set before a given function is to be executed on a thread in the pipeline, then that function execution is not performed on the thread (is ignored). (In the present embodiment, functions not dependent on each other are done in parallel, so that non-dependent functions will still be performed even if the failed bit is set. If functions not dependent on each other were to be done in series (in a serial fashion), then one could, for example, use several "failed-bits" (a bitmap indicating processing failures), so that a functional unit not dependent on the completion of previous functional units can still execute even if previous functional units have not processed the thread).

In this embodiment, as well as the "failed-bit" associated with a thread, a "completeness identifier" in respect of the texturing operations for a thread is maintained. This texture "completedness identifier" is in the form of a bit field indicating which texture data has been fetched already and a counter indicating which texture pass (anisotropic/mipmapping) the thread is on. This data is updated each time data is transferred from the caches to the "fragment data area" associated with the fragment in question. When all required data has been transferred, and the thread has completed all its texture passes, the texture processing of the thread is taken as being completed.

This texture completedness identifier associated with a thread is used to identify whether there are more texture instructions for the thread to complete, and if so, to cause the thread to be returned to pass through the pipeline again for the next texture instruction to be performed on the thread (and so on). This is achieved in the present embodiment as follows.

Each time the thread passes through the texturing unit 23, the texturing "completedness identifier" in respect of the thread is updated in dependence on the texturing processing that has been able to be executed on the thread.

The texturing unit 23 also sets the "failed bit" for the thread, in dependence on whether all the texturing operations necessary for the thread have been completed or not (i.e. in dependence on the state of the texturing completeness identifier). If there are still texturing operations to be performed following a passage of the thread through the texturing unit, then the texturing unit sets the "failed" bit for the thread to show that the thread has not completed its processing, and so should be returned through the pipeline again.

Then, on the thread's next passage through the pipeline, the texturing unit 23 will try to perform further texture operations on the thread, update the texture "completedness identifier" and set the "failed" bit for the thread accordingly, until such time as the thread has passed through the pipeline a sufficient number of times for all the necessary texturing operations to be completed (in which case the texturing unit 23 will not set the "failed bit", so the thread will not "fail" in respect of the texturing operations at least).

It should be noted that the consequence of this operation is that in the event that the texture operations have not been completed on a passage of the thread through the pipeline, the failed bit for the thread is set, and so the subsequent functional units of the pipeline will not attempt to process the thread. This is to prevent the functional units after the texturing unit continuing attempting execution on an already deemed to "fail" thread.

In the present embodiment, such a "partial" completedness identifier is only maintained in respect of texture operations. The other functional units do not track partial completedness, but they just "retry" the thread each time they receive it until all the (relevant) functional units have success in the same passage through the pipeline. However, it would be possible to track partial completeness for the processing of other functional units, e.g., in the same manner as for the texture processing, if desired.

Thus, the other functional units in the pipeline will accordingly simply "retry" their processing of the thread on each passage of the thread through the pipeline while all the texturing instructions are being completed, and this will be repeated (if necessary) until, in the present embodiment, the texture instructions are successfully completed and all the (relevant) functional units have success in the same passage through the pipeline.

If all of the functional units have completed and succeeded in their processing on a thread, then a "completed bit" is set for the thread. This indicates that the thread has completed its execution and has no more instructions to execute, and is checked by the functional units to ensure that completed threads that are recirculated through the pipeline, e.g., due to a failed dependency (ordering) requirement, and/or due to there not being a physical output buffer available to them, are not re-executed by the pipeline, but simply pass through the pipeline without being operated on.

When a thread reaches the branch unit 28 at the end of the pipeline, the branch unit 28 determines whether the thread can be allowed to exit the pipeline or whether it should be returned via the return path 14 to pass through the pipeline again.

The branch unit 28 firstly determines whether the "failed" bit has been set for the thread. If that bit has been set, that indicates in the present embodiment that a process for the thread has failed or has not completed all its instruction cycles, and so the thread must be returned to pass through the pipeline again.

The branch unit 28 also checks when a thread reaches the end of the pipeline whether there was any requirement in relation to the thread that all the 2×2 threads in the quad of threads that the thread relates to must exit the pipeline simultaneously, and/or a requirement that threads for the same fragment (x, y) position have to exit the pipeline in order (as discussed above in relation to FIG. 1). It also checks whether the thread's virtual output buffer is attached to a physical output buffer or not (or if not, the thread must loop back until it has been assigned to a physical output buffer (as discussed above)).

If any of these requirements are required but have not yet been met, then the thread is returned to pass through the pipeline again (i.e. is not allowed to exit the pipeline).

Thus even if a thread has completed its instructions, the branch unit 28 may still return a thread to the beginning of the pipeline (block the thread from exiting the pipeline) if any of these requirements are required but not yet met.

Although the present invention has been described above with particular reference to graphics processing, as will be appreciated by those skilled in the art, the present invention can be used for other pipelined microprocessor arrangements, and, indeed, for other pipelined graphics processing arrangements.

It can be seen from the above that the present invention, in its preferred embodiments at least, provides a relatively low-cost mechanism that can significantly improve throughput for a large number of threads in a pipelined microprocessor arrangement, but without the need for any prioritisation or thread selection logic, or any kind of retry buffer. Indeed, the Applicants have found that arrangements in accordance with the present invention can provide close to 100% utilisation of the pipeline in the best case. This is achieved in the preferred embodiments of the present invention at least by providing a pipelined arrangement in which any "failed" threads (e.g., and in particular, threads that trigger a "cache miss") are allowed to continue through the pipeline, but then any threads which have not completed their processing when they reach the end of the pipeline are returned to the beginning of the pipeline for sending through the pipeline again.

The invention claimed is:

1. A method of operating a microprocessor system that includes a pipeline comprising a plurality of functional units arranged in a pipelined fashion and in which functional units of the pipeline can process threads for execution at the same time as other functional units of the pipeline are processing other threads for execution, the method comprising:

associating a series of instructions to be carried out on successive passes through the pipeline with a thread to be processed, each of said instructions indicating processing to be carried out on said thread during one pass through said pipeline;

determining, when the thread reaches the end of the pipeline on a given passage through the pipeline, whether all the instructions of said series of instructions for the thread have been completed and, if all instructions of said series of instructions for the thread have not been completed, recirculating the thread from the end of the pipeline to the beginning of the pipeline and sending the thread through the pipeline again; and wherein, on a given passage of said non-completed thread through the pipeline, if processing for a current instruction of said non-completed thread cannot be carried out by the functional unit the thread has reached, passing the non-completed thread to the next functional unit, so as to allow the non-completed thread to continue through the pipeline; and recirculating the non-completed thread from the end of the pipeline to the beginning of the pipeline and carrying out said current instruction for the thread again;

if the processing for the current instruction for said non-completed thread has been carried out on the passage of the thread through the pipeline, recirculating the non-completed thread from the end of the pipeline to the beginning of the pipeline; and carrying out the next instruction in said series of instructions for the thread on said non-completed thread, whereby the thread is successively passed through said pipeline a plurality of times in order to carry out said series of instructions on the thread.

2. The method of claim 1, wherein the microprocessor pipeline is a graphics processing pipeline.

3. The method of claim 1, wherein each thread is an instance of the fragment shader program a graphics fragment is executing.

4. The method of claim 1, wherein the number of threads in the pipeline is equal to the number of pipeline steps.

5. The method of claim 1, comprising associating with each thread information that indicates whether the thread's processing has been completed or not.

6. The method of claim 1, comprising maintaining an indication of whether a thread's processing has been completed or not in respect of plural separate processes that the thread is to undergo.

7. A method of operating a pipelined microprocessor system that includes a pipeline comprising a plurality of functional units arranged in a pipelined fashion and in which threads for execution that are passed down the pipeline have associated with them information indicating whether a process or processes to be performed for the thread have been completed, the method comprising:
   associating a series of instructions to be carried out on successive passes through the pipeline with a thread to be processed, each of said instructions indicating processing to be carried out on said thread during one pass through said pipeline;
   associating with said thread to be processed information for indicating whether all instructions of said series of instructions for the thread have been completed;
   assessing, when the thread reaches the end of the pipeline on a given passage through the pipeline, the information associated with the thread indicating whether all instructions to be performed for the thread have been completed and determining whether all the instructions of said series of instructions for the thread have been completed; and
   if all instructions of said series of instructions for the thread have not been completed, returning the thread to the beginning of the pipeline for sending through the pipeline again; wherein, on a given passage of said non-completed thread through the pipeline:
   if processing for a current instruction of said non-completed thread cannot be carried out by the functional unit the thread has reached,
      passing the non-completed thread to the next functional unit, so as to allow the non-completed thread to continue through the pipeline; and
      recirculating the non-completed thread from the end of the pipeline to the beginning of the pipeline and carrying out said current instruction for the thread again; and
   if the processing for the current instruction for said non-completed thread has been carried out on the passage of the thread through the pipeline,
      recirculating the non-completed thread from the end of the pipeline to the beginning of the pipeline; and
      carrying out the next instruction in said series of instructions for the thread on said non-completed thread, whereby the thread is successively passed through said pipeline a plurality of times in order to carry out said series of instructions on the thread.

8. The method of claim 1, comprising monitoring whether a thread has any dependency requirements in relation to other threads in the pipeline.

9. The method of claim 1, comprising only allowing a thread to finally exit the pipeline if all its necessary processing has been completed, and if any dependency criteria associated with the thread are met.

10. The method of claim 1, wherein the pipeline has associated with it one or more cache memories, and comprising pre-fetching the content of caches in the pipeline.

11. The method of claim 1, comprising monitoring order information associated with threads received by the pipeline for processing.

12. The method of claim 1, comprising associating each thread entering the pipeline with one of a plurality of virtual output buffers that can be allocated to threads.

13. A method of operating a microprocessor system that includes a pipeline comprised of a plurality of functional units arranged in a pipelined fashion in which each stage in the pipeline can process a thread for execution at the same time as other stages in the pipeline are processing other threads for execution, the method comprising:
   associating each thread entering the pipeline with one of a plurality of virtual output buffers that can be allocated to threads;
   associating at least one of the virtual output buffers with a physical output buffer; and
   determining, when a thread reaches the end of the pipeline, whether the virtual output buffer associated with the thread has been associated with a physical output buffer, and if the buffer has not been associated, recirculating the thread from the end of the pipeline to the beginning of the pipeline for sending through the pipeline again.

14. A microprocessor system for processing multiple threads for execution that are sent to it, the system comprising:
   a pipeline comprised of a plurality of functional units arranged in a linear, pipelined fashion, one after another, and each functional unit is configured to receive and process threads received from the preceding functional unit in the pipeline, and to pass threads after processing to the next functional unit in the pipeline;
   at least one of the functional units in the pipeline is configured to, if it cannot process a thread when received, pass the thread onto the next functional unit in the pipeline; and
   a functional unit at the end of the pipeline for returning a thread whose processing could not be completed by said at least one of the functional units on its passage through the pipeline to the beginning of the pipeline for sending through the pipeline again, wherein said system is further configured to:
   associate a series of instructions to be carried out on successive passes through the pipeline with a thread to be processed, each of said instructions indicating processing to be carried out on said thread during one pass through said pipeline, and
   determine, when said thread having a series of instructions to be carried out on successive passes through the pipeline reaches the end of the pipeline, whether all the instructions have been completed, and, if all instructions have not been completed, recirculate the thread from the end of the pipeline to the beginning of the pipeline for sending through the pipeline again; and, on a given passage of said non-completed thread through the pipeline,
   if processing for a current instruction of said non-completed thread cannot be carried out by the functional unit the thread has reached,
      passing the non-completed thread to the next functional unit, so as to allow the non-completed thread to continue through the pipeline; and
      recirculating the non-completed thread from the end of the pipeline to the beginning of the pipeline and carrying out said current instruction for the thread again;
   if the processing for the current instruction for said non-completed thread has been carried out by the on the passage of the thread through the pipeline,
      recirculating the non-completed thread from the end of the pipeline to the beginning of the pipeline; and carrying out the next instruction in said series of instructions for the thread on said non-completed thread, whereby the thread is successively passed through said pipeline a plurality of times in order to carry out said series of instructions on the thread.

15. The microprocessor system of claim 14, wherein the microprocessor system is a graphics processing system.

16. The microprocessor system of claim 14, wherein each thread is an instance of the fragment shader program a graphics fragment is executing.

17. The microprocessor system of claim 14, wherein the number of threads in the pipeline is equal to the number of pipeline steps.

18. The microprocessor system of claim 14, comprising means for associating with each thread information that indicates whether the thread's processing has been completed or not.

19. The microprocessor system of claim 14, comprising means for maintaining an indication of whether a thread's processing has been completed or not in respect of plural separate processes that the thread is to undergo.

20. A pipelined microprocessor system that includes a pipeline comprising a plurality of functional units arranged in a pipelined fashion and in which threads for execution that are passed down the pipeline can be associated with a series of instructions to be carried out on successive passes through the pipeline, each instruction of said series of instructions indicating processing to be carried out on said thread during one pass through the pipeline, the system comprising:

means for assessing each thread to determine whether all instructions to be performed for the thread have been completed when said thread reaches the end of the pipeline; and means for returning said thread to the beginning of the pipeline for sending through the pipeline again if all instructions for the thread have not been completed, wherein, on a given passage of said non-completed thread through the pipeline, if processing for a current instruction of said non-completed thread cannot be carried out by the functional unit the thread has reached, said functional unit passes the non-completed thread to the next functional unit, so as to allow the non-completed thread to continue through the pipeline; and said returning means recirculates the non-completed thread from the end of the pipeline to the beginning of the pipeline to carry out said current instruction for the thread again; and if the processing for the current instruction for said non-completed thread has been carried out by on the passage of the thread through the pipeline, said returning means recirculates the non-completed thread from the end of the pipeline to the beginning of the pipeline to carry out the next instruction in said series of instructions for the thread, whereby the thread is successively passed through said pipeline a plurality of times in order to carry out said series of instructions on the thread.

21. The microprocessor system of claim 14, comprising a functional unit for monitoring whether a thread has any dependency requirements in relation to other threads in the pipeline.

22. The microprocessor system of claim 14, comprising a functional unit operable to only allow a thread to finally exit the pipeline if all its necessary processing has been completed, and if any dependency criteria associated with the thread are met.

23. The microprocessor system of claim 14, further comprising one or more cache memories, and a functional unit for pre-fetching the content of a cache or caches.

24. The microprocessor system of claim 14, comprising means for monitoring order information associated with threads received by the pipeline for processing.

25. The microprocessor system of claim 14, comprising means for associating each thread entering the pipeline with one of a plurality of virtual output buffers that can be allocated to threads.

26. A microprocessor system comprising:

a pipeline comprising a plurality of functional units arranged in a pipelined fashion in which each stage in the pipeline can process a thread for execution at the same time as other stages in the pipeline are processing other threads for execution;

at least one physical output buffer;

processing logic configured to associate each thread entering the pipeline with one of a plurality of virtual output buffers that can be allocated to threads;

processing logic configured to associate at least one of the virtual output buffers with said at least one physical output buffer; and processing logic configured to, when a thread reaches the end of the pipeline, determine whether the virtual output buffer associated with the thread has been associated with said at least one physical output buffer, and if said buffer has not, recirculate the thread from the end of the pipeline to the beginning of the pipeline for sending through the pipeline again.

27. A computer program product comprising a non-transitory computer readable storage medium including software which, when installed on a data processor, carries out the method of claim 1.

28. A computer program product comprising a non-transitory computer readable storage medium including software which, when installed on a data processor, carries out the method of claim 13.

* * * * *